(12) United States Patent
Borthwick et al.

(10) Patent No.: US 8,949,158 B2
(45) Date of Patent: Feb. 3, 2015

(54) COST-SENSITIVE ALTERNATING DECISION TREES FOR RECORD LINKAGE

(75) Inventors: Andrew Borthwick, Kirkland, WA (US); Sheng Chen, Ridgefield, NJ (US)

(73) Assignee: Intelius Inc., Bellevue, WA (US)

( * ) Notice: Subject to any disclaimer, the term of this patent is extended or adjusted under 35 U.S.C. 154(b) by 230 days.

(21) Appl. No.: 13/281,383

(22) Filed: Oct. 25, 2011

(65) Prior Publication Data
US 2012/0278263 A1 Nov. 1, 2012

Related U.S. Application Data

(60) Provisional application No. 61/406,264, filed on Oct. 25, 2010, provisional application No. 61/409,908, filed on Nov. 3, 2010, provisional application No. 61/466,608, filed on Mar. 23, 2011, provisional application No. 61/527,926, filed on Aug. 26, 2011.

(51) Int. Cl.
*G06F 15/18* (2006.01)
*G06F 17/30* (2006.01)
*G06N 7/00* (2006.01)
*G06K 9/62* (2006.01)

(52) U.S. Cl.
CPC ........ *G06F 17/30303* (2013.01); *G06K 9/6256* (2013.01); *G06N 7/005* (2013.01)
USPC .......................................................... 706/12

(58) Field of Classification Search
None
See application file for complete search history.

(56) References Cited

U.S. PATENT DOCUMENTS

| 5,819,291 | A | 10/1998 | Haimowitz et al. |
| 6,523,019 | B1 | 2/2003 | Borthwick |
| 7,379,926 | B1 | 5/2008 | Belniak et al. |
| 2004/0019593 | A1 | 1/2004 | Borthwick et al. |
| 2007/0294187 | A1* | 12/2007 | Scherrer ........................ 705/75 |
| 2010/0070457 | A1 | 3/2010 | Kejariwal et al. |

OTHER PUBLICATIONS

Bilenko et al. "On Evaluation and Training-Set Construction for Duplicate Detection", KDD-2003 Workshop on Data Cleaning, Record Linkage, and Object Consolidation, pp. 7-12.*
Freund et al. "The alternating decision tree learning algorithm", ICML, 1999, pp. 10.*
CiteSeerX. http://citeseerx.ist.psu.edu/.
JBoost Project. http://jboost.sourceforge.net.
A Light intro to Boosting. http://cbio.mskcc.org/~aarvey/BoostingLightIntro.pdf.
A. Arasu, M. Götz, and R. Kaushik. On active learning of record matching packages. In Proc. ACM SIGMOD Int. Conf. Management of Data, pp. 783-794, 2010.

(Continued)

*Primary Examiner* — Li-Wu Chang
(74) *Attorney, Agent, or Firm* — Nixon & Vanderhye P.C.

(57) ABSTRACT

Record Linkage (RL) is the task of identifying two or more records referring to the same entity (e.g., a person, a company, etc.). RL models can be based on Cost Sensitive Alternating Decision Trees (ADTree), an algorithm that uniquely combines boosting and decision trees algorithms to create shorter and easier-to-interpret linking rules. These models can be naturally trained to operate at industrial precision/recall operating points, and the shorter output rules are so clear that it can effectively explain its decisions to non-technical users via score aggregation or visualization. The models significantly outperform other baselines on the desired industrial operating points, and the improved understanding of the model's decisions led to faster debugging and feature development cycles.

15 Claims, 40 Drawing Sheets

(56) References Cited

OTHER PUBLICATIONS

J. Artiles, A. Borthwick, a. S. S. J. Gonzalo, and E. Amigó. Weps-3 evaluation campaign: Overview of the web people search clustering and attribute extraction tasks. In CLEF-2010.

I. Bhattacharya and L. Getoor. Iterative record linkage for cleaning and integration. In Proc. ACM SIGMOD workshop on Research issues in data mining and knowledge discover, pp. 11-18, 2004.

M. Bilenko and S. Basu. Adaptive product normalization: Using online learning for record linkage in comparison shopping. In Proc. IEEE Int. Conf. Data Mining, pp. 58-65, 2005.

M. Bilenko, B. Kamath, and R. J. Mooney. Adaptive blocking: Learning to scale up record linkage and clustering. In Proc. IEEE Int. Conf. Data Mining, pp. 87-96, 2006.

M. Bilenko and R. J. Mooney. Adaptive duplicate detection using learnable string similarity measures. In Proc. ACM KDD Int. Conf. Knowledge Discovery and Data Mining, pp. 39-48, 2003.

A. Borthwick, M. Buechi, and A. Goldberg. Key concepts in the choicemaker 2 record matching system. In Proc. ACM KDD Workshop on Data Cleaning, Record Linkage, and Object Consolidation, 2003.

L. Breiman, J. Friedman, and C. J. Stone. Classification and Regression Trees. Chapman and Hall/CRC, 1984.

A. Chandel, O. Hassanzadeh, N. Koudas, M. Sadoghi, and D. Srivastava. Benchmarking declarative approximate selection predicates. In Proc. ACM SIGMOD Int. Conf. Management of Data, pp. 353-364, 2007.

S. Chaudhuri, K. Ganjam, V. Ganti, and R. Motwani. Robust and efficient fuzzy match for online data cleaning. In Proc. ACM SIGMOD Int. Conf. Managment of Data, pp. 313-324, 2003.

P. Christen and T. Churches. Febrl—Freely Extensible Biomedical Record Linkage. Australian National University, 0.4 edition.

X. Dong, A. Y. Halevy, and J. Madhavan. Reference reconciliation in complex information spaces. In Proc. ACM SIGMOD Int. Conf. Management of Data, pp. 85-96, 2005.

W. Eckerson. Data warehousing special report: Data quality and the bottom line. Applications Development Trends, 2002.

A. K. Elmagarmid, P. G. Ipeirotis, and V. S. Verykios. Duplicate record detection: A survey. IEEE Trans. Knowledge and Data Engineering, 19(1):1-16, 2007.

W. Fan and S. J. Stolfo. Adacost: misclassification cost-sensitive boosting. In Proc. Int. Conf. Machine Learning, pp. 97-105, 1999.

Y. Freund and L. Mason. The alternating decision tree algorithm. In Proc. Int. Conf. Machine Learning, pp. 124-133, 1999.

Y. Freund and R. Schapire. A decision-theoretic generalization of on-line learning and an application to boosting. J. Computer and System Sciences, 55(1):119-139, 1997.

L. Gravano, P. G. Ipeirotis, H. V. Jagadish, N. Koudas, S. Muthukrishnan, and D. Srivastava. Approximate string joins in a database (almost) for free. In Proc. Int. Conf. Very Large Data Bases, pp. 491-500, 2001.

L. Gu, R. Baxter, D. Vickers, and C. Rainsford. Record linkage: Current practice and future directions. Technical report, CSIRO Mathematical and Information Sciences, 2003.

D. J. Hand. Measuring classifier performance: a coherent alternative to the area under roc curve. Machine Learning, 77(1):103-123,2009.

H. He and E. A. Garcia. Learning from imbalanced data. IEEE Trans. Knowledge and Data Engineering, 21(9):1263-1284, 2009.

M. A. Hernández and S. J. Stolfo. The merge/purge problem for large databases. In Proc. ACM SIGMOD Int. Conf. Management of Data, pp. 127-138, 1995.

M. A. Hernández and S. J. Stolfo. Real-world data is dirty: Data cleansing and the merge/purge problem. In Proc. ACM KDD Int. Conf. Knowledge Discovery and Data Mining, pp. 9-37, 1998.

M. Jaro. Advances in record-linkage methodology as applied to matching the 1985 census of tampa, florida. J. the American Statistical Association, 84(406):414-420, 1989.

T. Joachims. Making large-Scale SVM Learning Practical. Advances in Kernel Methods—Support Vector Learning. MIT-Press, 1999.

N. Koudas, S. Sarawagi, and D. Srivastava. Record linkage: Similarity measures and algorithms. In Proc. ACM SIGMOD Int. Conf. Management of Data, pp. 802-803, 2006.

V. I. Levenshtein. Binary codes capable of correcting deletions, insertions and reversals. Soviet Physics Doklady, 10:707-710, 1966.

A. McCallum, K. Nigam, and L. Ungar. Efficient clustering of high-dimensional data sets with application to reference matching. In Proc. ACM KDD Int. Conf. Knowledge Discovery and Data Mining, pp. 169-178, 2000.

A. E. Monge and C. P. Elkan. An efficient domain-independent algorithm for detecting approximately duplicate database records. In Proc. ACM SIGMOD Workshop on Research Issues on Data Mining and Knowledge Discovery, pp. 23-29, 1997.

S. B. Needleman and C. D. Wunsch. A general method applicable to the search for similarities in the amino acid sequence of two proteins. J. Molecular Biology, 48(3):443-453, 1970.

V. Papadouka, P. Schaeffer, A. Metroka, A. Borthwick, and et al. Integrating the new york citywide immunization registry and the childhood blood lead registry. J. Public Health Management and Practice, 10:S72, 2004.

E. S. Ristad and P. N. Yianilos. Learning string edit distance. IEEE Trans. Pattern Analysis and Machine Intelligence, 20(5):522-532, 1998.

S. Sarawagi and A. Bhamidipaty. Interative deduplication using active learning. In ACM SIGKDD Int. Conf. Knowledge Discovery and Data Mining, pp. 269-278, 2002.

P. Singla and P. Domingos. Multi-relational record linkage. In Proc. ACM KDD Workshop on Multi-Relational Data Mining, pp. 31-48, 2004.

R. Snow, B. O'Connor, D. Jurafsky, and A. Y. Ng. Cheap and fast—but is it good? : evaluating non-expert annotations for natural language tasks. In Proc. ACL Conf. Empirical Methods in Natural Language Processing, pp. 254-263, 2008.

Y. Sun, M. S. Kamel, A. K. C. Wong, and Y. Wang. Cost-sensitive boosting for classification of imbalanced data. Pattern Recognition, 40(12):3358-3378, 2007.

W. E. Winkler. Overview of record linkage and current research directions. Technical report, Bureau of the Census, 2006.

B. Zadrozny, J. Langford, and N. Abe. Cost-sensitive learning by cost-proportionate example weighting. In Proc. Int. Conf. Data Mining, pp. 435-442, 2003.

H. Zhao and S. Ram. Entity identification for heterogeneous database integration: a multiple classifier system approach and empirical evaluation. Information Systems, 30(2):119-132, 2005.

PCT International Search Report and Written Opinion of the International Searching Authority dated Apr. 10, 2012.

Extended European Search Report dated Aug. 18, 2014, issued in European Patent Application No. 11 83 8549.

Freund, Yoav, et al., "The alternating decision tree learning algorithm," Dec. 31, 1999, XP55132487, 10 pages.

* cited by examiner

| Field | Record 1 | Record 2 | Feature |
|---|---|---|---|
| Name | Robert Jones | Robert Jones | Name Frequency = c. 882.6 |
| Birthday | 3/1/1966 | 3/15/1966 | Difference = 14 days |
| Street address | 234 Chestnut St. | 121 Walnut St. | Exact match of street = False |
| City/State | Seattle, WA | Seattle, WA | Population of Seattle region = c. 3.3 million |
| Phone number | 206-555-1234 | 206-345-9123 | Type of phone match = area code |

FIG. 5

| Algorithm | Human Interpretability | Cost Sensitivity | Captures Feature Interactions | Handle Diverse Feature Types |
|---|---|---|---|---|
| Decision Trees | Yes | No | Yes | Yes |
| Support Vector Machines | No | With Custom Kernel | With Custom Kernel | Not Easily |
| Boosted Decision Trees | No | No | Yes | Yes |
| Alternating Decision Trees | Yes | No | Yes | Yes |
| CS-ADT's | Yes | Yes | Yes | Yes |

FIG. 7

|  | | True class | |
|---|---|---|---|
| | | P | N |
| Hypothesis output | P | C(P, P) | C(P, N) |
| | N | C(N, P) | C(N, N) |

FIG. 9

A cost matrix for cost sensitive learning

| ID | Company | Address | | Name | Phone # |
|---|---|---|---|---|---|
| Person 1 | Evanston Chiropractic Life Center Inc | 5716 S Evanston Ave | IN, 46123 | Ronald Eugene Raulston, *Sr.* | 219-821-8900 |
| Person 2 | Evanston Chiropractic Life Center Inc | 5716 S Evanston Ave | IN, 46123 | Ronald Eugene Raulston, *Jr.* | 219-821-8900 |

FIG. 10

An example of a pair of person profile records

Feature values of phone_match

A tiny ADTree for person linkage

A confusion matrix for binary classification

Comparison of average recall's for ADTree/CS-ADTree

P-R curves of ADTree/CS-ADTree

Threshold range of ADTree/CS-ADTree w.r.t high range

Partial CS-ADTree. If name_suffix=differ, we get a strong negative score and don't query additional features.

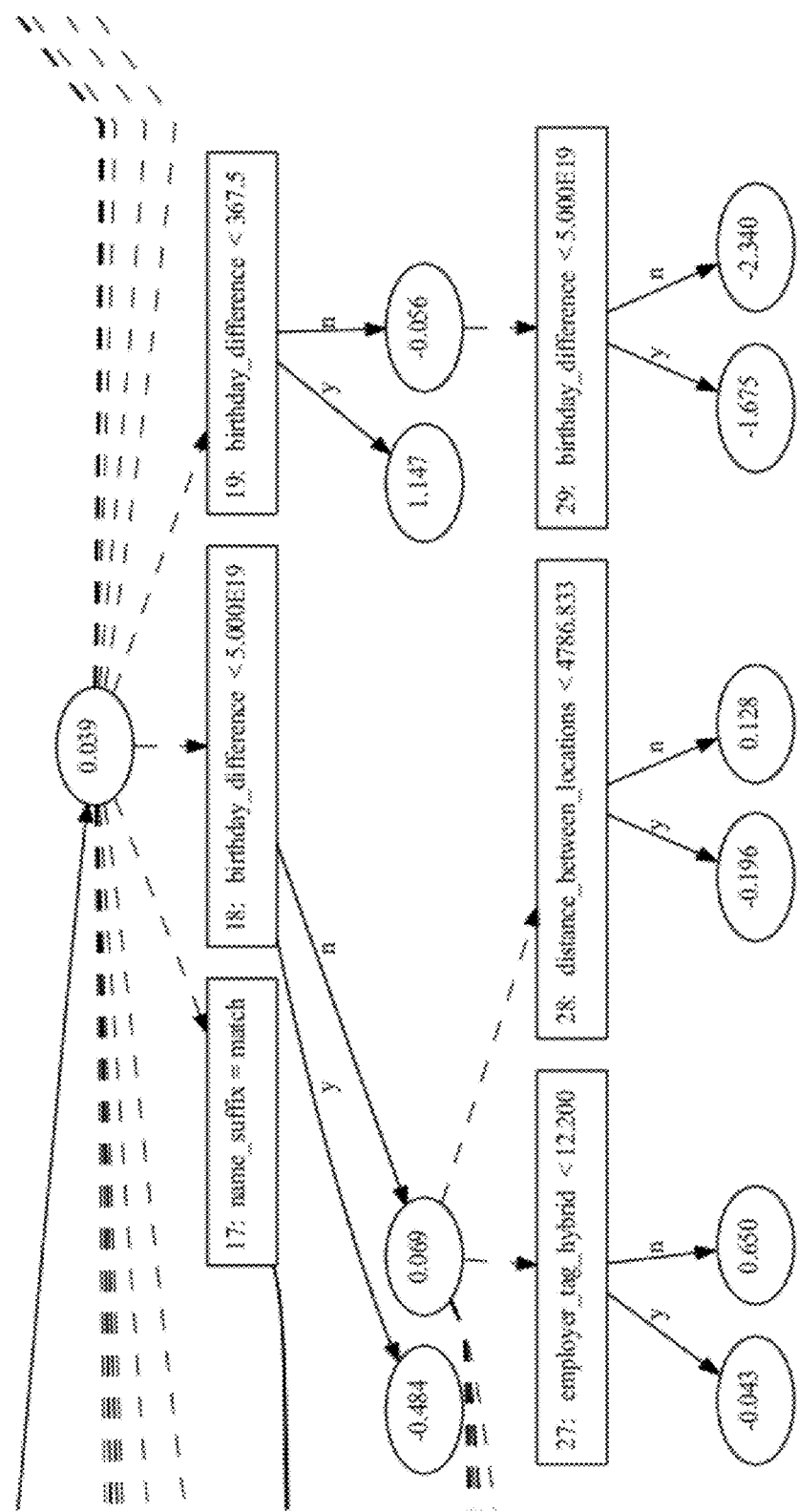

Partial CS-ADTree. Note how we assign different scores to different birthday distances and query additional features if birthday difference is unknown (infinite).

P-R curves of 3 active learning approaches

P-R curves of ADTree and CS-ADTree on $E$

Histogram of *f*'s for ADTree, CS-ADTree, and alternative ML techniques on *E*

of US 8,949,158 B2 …

COST-SENSITIVE ALTERNATING DECISION TREES FOR RECORD LINKAGE

CROSS-REFERENCES TO RELATED APPLICATIONS

Priority is claimed from U.S. provisional patent applications 61/406,264 filed on 25 Oct. 2010; 61/409,908 filed on 3 Nov. 2010; 61/466,608 filed on 23 Mar. 2011; and 61/527,926 filed 26 Aug. 2011, each incorporated herein by reference for all purposes (specifically including all drawings, tables, equations and expressions) as if expressly set forth.

STATEMENT REGARDING FEDERALLY SPONSORED RESEARCH OR DEVELOPMENT

None

FIELD

The technology herein relates to databases and record linkage, and more particularly to cost-sensitive alternating decision trees for record linkage.

BACKGROUND AND SUMMARY

Many consumers want to research the background of childcare providers, coaches, healthcare workers and home contractors. Many of us want to reconnect with family and friends. Business users often have good reason to check and monitor the background of potential employees and ensure they are the best person for the job. Criminal checks can enable consumers to make informed choices about the people they trust by delivering appropriate and accurate public records information. Identity verification can assist businesses and consumers to confirm that someone is who they say they are.

Given enough time to search, you may be able to discover if your prospective employee has been charged with DUI, if your son's soccer coach has ever been accused of domestic violence, and where your old college roommate or high school classmate is now living. But a significant challenge is to be sure the information you are seeing pertains to the right person or corporation. We are all concerned about detection and prevention of identity theft, America's fastest-growing crime. Many of us once carried our social security cards in our wallets, but the risk of identity theft has cautioned us to now reveal our social security number to no one other than our bank, our employer and our taxing authority on a confidential need-to-know basis. Without a unique national identification number that could serve as an index into a variety of records from many different sources, it is challenging to accurately link such records without making mistakes that could provide incorrect information, damage someone's reputation or destroy confidence in the information source.

FIG. 1 shows an example of the scope of the problem. There are over 300 million people living in the U.S. alone, and billions of records pertaining to all those people. Take the example of trying to find out accurate personal information about Jim Adler, age 68 of Houston Tex. By analyzing available records, it may be possible to find 213 records pertaining to "Jim Adler" but it turns out that those 213 records may pertain to 37 different Jim Adlers living all over the country. It is desirable to link available records to determine which ones pertain to the right Jim Adler as opposed to Jim Adler age 57 of McKinney Tex., or Jim Adler age 32 of Hastings Nebr., or Jim Adler age 48 of Denver Colo. or any of the other 33 μm Adlers for whom there are records. It is further desirable to avoid incorrectly linking Jim Adler the First Selectman of Canaan N.H. with Jim Adler serving time in the Forrest City Arkansas Federal Correctional Institute.

Some have spent significant effort to build comprehensive databases that link related records to provide background, criminal, identity and other checks for use by employers and consumers. When consolidating information from multiple data sources, it is often desirable to create an error-free database through locating and merging duplicate records belonging to the same entity. These duplicate records could have many deleterious effects, such as preventing discoveries of important regularities, and erroneously inflating estimates of the number of entities. Unfortunately, this cleaning operation is frequently quite challenging due to the lack of a universal identifier that would safely but uniquely identify each entity.

The study of quickly and accurately identifying duplicates from one/multiple data source(s) is generally recognized as Record Linkage ("RL"). Synonyms in the database community include record matching, merge-purge, duplicate detection, and reference reconciliation. RL has been successfully applied in census databases, biomedical databases, and web applications such as reference disambiguation of the scholarly digital library CiteSeerX and online comparison shopping.

One example non-limiting general approach to record linkage is to first estimate the similarity between corresponding fields to reduce or eliminate the confusion brought by typographical errors or abbreviations. A straightforward implementation of similarity function could be based on edit distance, such as the Levenshtein distance. After that, a strategy for combining these similarity estimates across multiple fields between two records is applied to determine whether the two records are a match or not. The strategy could be rule-based, which generally relies on domain knowledge or on generic distance metrics to match records. However, a common practice is to use Machine Learning (ML) techniques, to treat the similarity across multiple fields as a vector of features and "learn" how to map them into a match/un-match binary decision. ML techniques that have been tried for RL include Support Vector Machines, decision trees, maximum entropy, or composite ML classifiers tied together by boosting or bagging.

Due to the importance of feature representation, similarity function design is at the core of many record linkage studies. As noted above, perhaps the most straightforward one is the Levenshtein distance which counts the number of insert, remove, and replace operations when mapping string A into B. Considering the unbalanced cost of applying different operations in practice, it is possible to modify the definition of edit distance to explicitly allow for cost customization by designers. In recent years similarity function design is increasingly focused on adaptive methods. Some have proposed similar stochastic models to learn the cost factors of different operations for edit distance. Rooted in the spirit of fuzzy match, some consider the text string at the tuple level and proposes a probabilistic model to retrieve the K nearest tuples with respect to an input tuple received in streamed format. Exploiting the similarity relation hidden under a big umbrella of linked pairs, some have iteratively extracted useful information from the pairs to progressively refine a set of similarity functions. Others introduce the similarity functions from probabilistic information retrieval and empirically study their accuracy for record linkage.

Whatever ingenious methods may be used for similarity functions, it is desirable to integrate all of these field-level similarity judgments into an overall match/no-match decision. Various learning methods have been proposed for this task. Some have proposed stacked SVMs to learn and classify pairs of records into match/unmatch, in which the second layer of SVMs is trained on a vector of similarity values that are output by the first layer of SVMs. Others consider the records in a database as nodes of a graph, and apply a clustering approach to divide the graph into an adaptively determined number of subsets, in which inconsistencies among paired records are expected to be minimized. Some instead consider features of records as nodes of a graph. Matched records would excite links connecting corresponding fields, which could be used to facilitate other record comparisons.

A well-performing pairwise classifier depends on the representativeness of the record pairs selected for training, which calls for an active learning approach to efficiently pick informative paired records from a data pool. Some have described committee-based active learning approaches for record linkage. Considering the efficiency concern of applying an active learning model on a data pool with quadratically large size, others propose a scalable active learning method that is integrated with blocking to alleviate this dilemma.

Despite its importance in producing accurate estimation of duplicates in databases, insufficient attention has been given to tailoring ML techniques to optimize the performance of industrial RL systems.

Example illustrative non-limiting embodiments herein provide cost sensitive extensions of the Alternating Decision Tree (ADTree) algorithm to address these and other problems. Cost Sensitive ADTrees (CS-ADTree) improve the ADTree algorithm which is well-suited to handle business requirements to deploy a system with extremely different minimum false-positive and false-negative error rates. One exemplary illustrative method assigns biased misclassification costs for positive class examples and negative class examples.

Exemplary illustrative non-limiting implementations provide record linkage of databases by ADTree. Considering that a problem of record linkage is that the business costs of misclassifying a matched pair and an unmatched pair can be extremely biased, we further propose CS-ADT which assigns a higher or lower misclassification cost for matched pairs than for non-matched pairs in the process of training ADTree. Experiments show CS-ADTree and ADTree perform extremely well on a clean database and exhibit superior performance on a noisy database compared with alternative ML techniques. We also demonstrate how the run-time representation of ADTree/CS-ADTree can facilitate human understandability of learned knowledge by the classifier and yield a compact and efficient run-time classifier.

Because ADTrees output a single tree with shorter and easy-to-read rules, the exemplary illustrative non-limiting technologies herein can effectively explain its decisions, even to non-technical users, using simple score aggregation and/or tree visualization. Even for very large models with hundreds of features, score aggregation can be straightforwardly applied to perform feature blame assignment—i.e., consistently calculate the importance of each feature on the final score of any decision. Improved understanding of these models can lead to faster debugging and feature development cycles.

Other non-limiting advantages features and advantages include:
Human-understandability
Confidence measure
Runtime efficiency from lazy evaluation
Capture intuitive feature interactions
Very competitive F-Measure
Bake preference for precision into algorithm
Better recall at high levels of precision
Other.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 5 shows example non-limiting illustrative person record linkage features;

FIG. 7 shows an example illustrative comparison of machine learning and record linkage approaches;

FIG. 9 is an example non-limiting cost matrix for cost sensitive learning;

FIG. 10 is a non-limiting illustrative example of a pair of person profile records;

DETAILED DESCRIPTION

Figure 1:
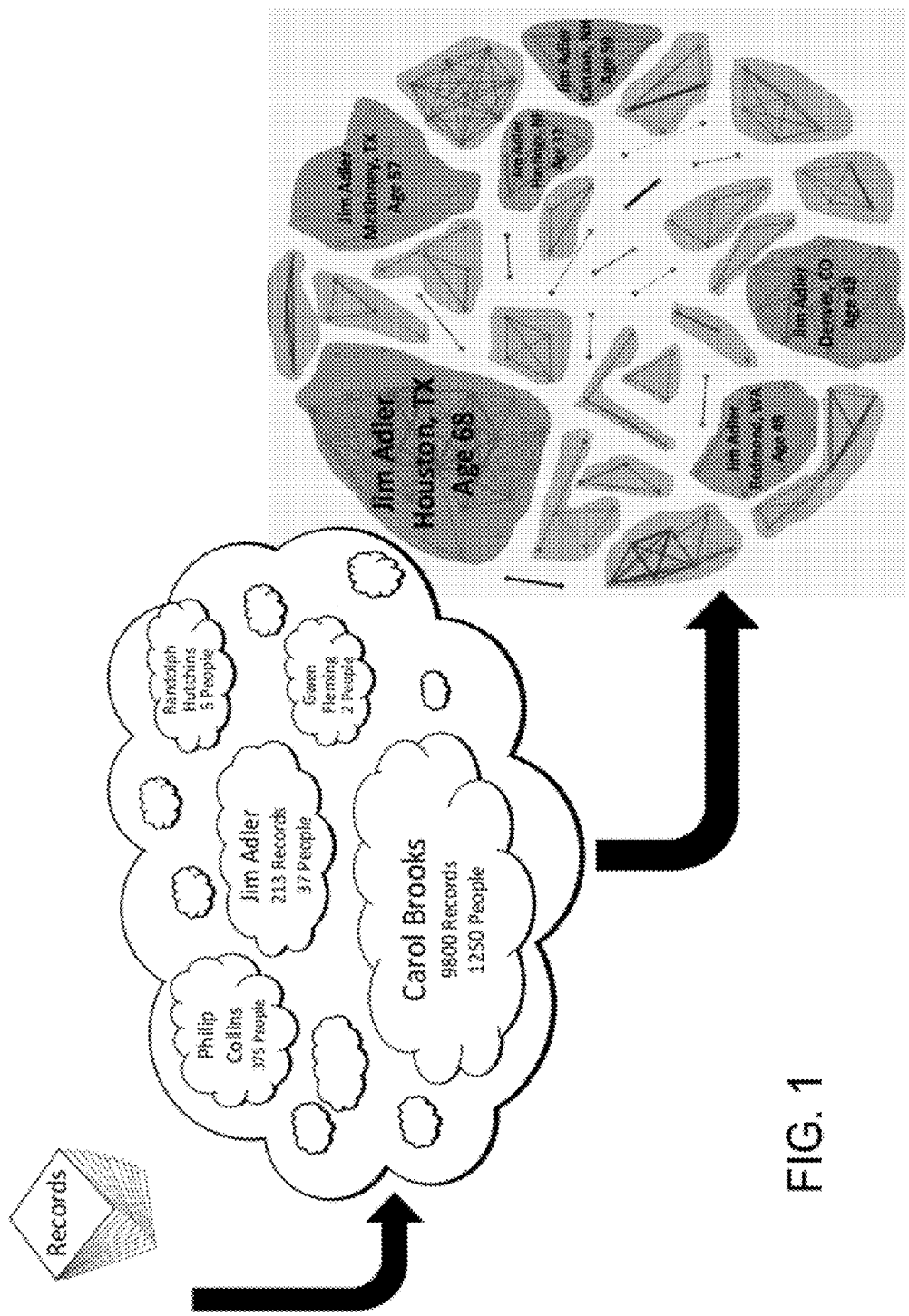
FIG. 1 illustrates the record linking problem for personal records.
Figure 2:
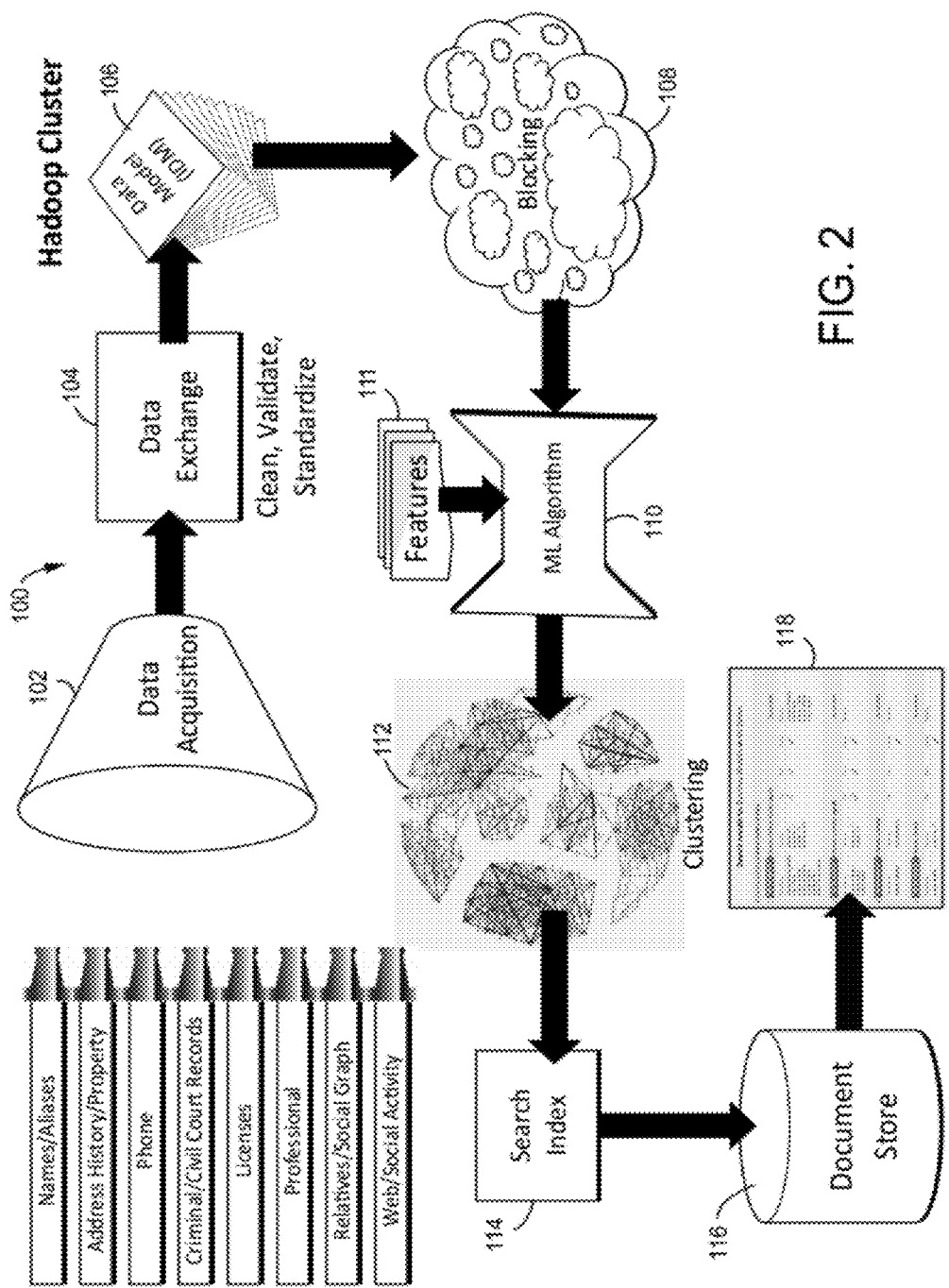
FIG. 2 shows an example non-limiting overall execution-time data processing system 100.

FIG. 2 shows a non-limiting illustrative example overall data processing system 100 providing record linkage using alternating trees and cost-sensitive learning. In the example shown, data is acquired from a variety of different sources including for example address history and real estate tax records, telephone records, criminal and civil court records, licenses, professional records, social graphs and social networking sites. This information can be acquired electronically (e.g., through use of web crawlers or other information harvesting technology), manually (e.g., through visual record inspection, telephone calls, personal visits, interviews, etc.) or both. In one example non-limiting implementation, the data acquisition block 102 may comprise one or more computers connected to the Internet or other electronic network that generates and transmits queries over the network, receives responses and stores the responses in non-transitory storage device(s).

In the example shown, the data acquired by data acquisition 102 is cleaned, validated and standardized using one or more data exchange computer processors 104 to provide outputs in a standardized data model 106. One exemplary non-limiting implementation uses one or more Hadoop clusters having sufficient numbers of nodes to provide necessary processing resources.

The standardized data 106 is then provided to a conventional blocking engine 108 that attempts to find groups of records that are similar in some way. The blocked records are then provided a "Machine Learning" (ML) processor 110 that applies alternate trees and cost-sensitivity to accurately link or match records. The resulting record linkages are further processed by a clustering process 112 to generate search indices 114 that are stored in a non-transitory document store 116. In the illustrative implementation, the blocking 108's job is to avoid recall loss in proposing pairwise judgments whereas the clustering 112's job is to turn pairwise judgments into correct partitioning of graph into entities. Truth is derived from human judgments on record pairs, whereas precision is based on True Positive/(True Positive+False Positive) and Recall is based on True Positive/(True Positive+False Negative).

Local and/or remote users can search the document store 116 via web browser based or other displays 118 and associated input devices (e.g., touch screens, keyboards, pointing devices, voice recognition input, smart phones, tablet computers, etc.) to access (e.g., via the Internet) the stored information (e.g., a records check on a son's soccer coach, a prospective employee, an investment advisor, etc.) on a free, trial or subscription basis.

The automated steps described above may be performed by computer under control of software instructions stored in non-transitory storage devices such as disk drives, flash memory devices or any other conventional program store(s). Accuracy can be measured on pairwise classification as match/no-match.

Figure 3:
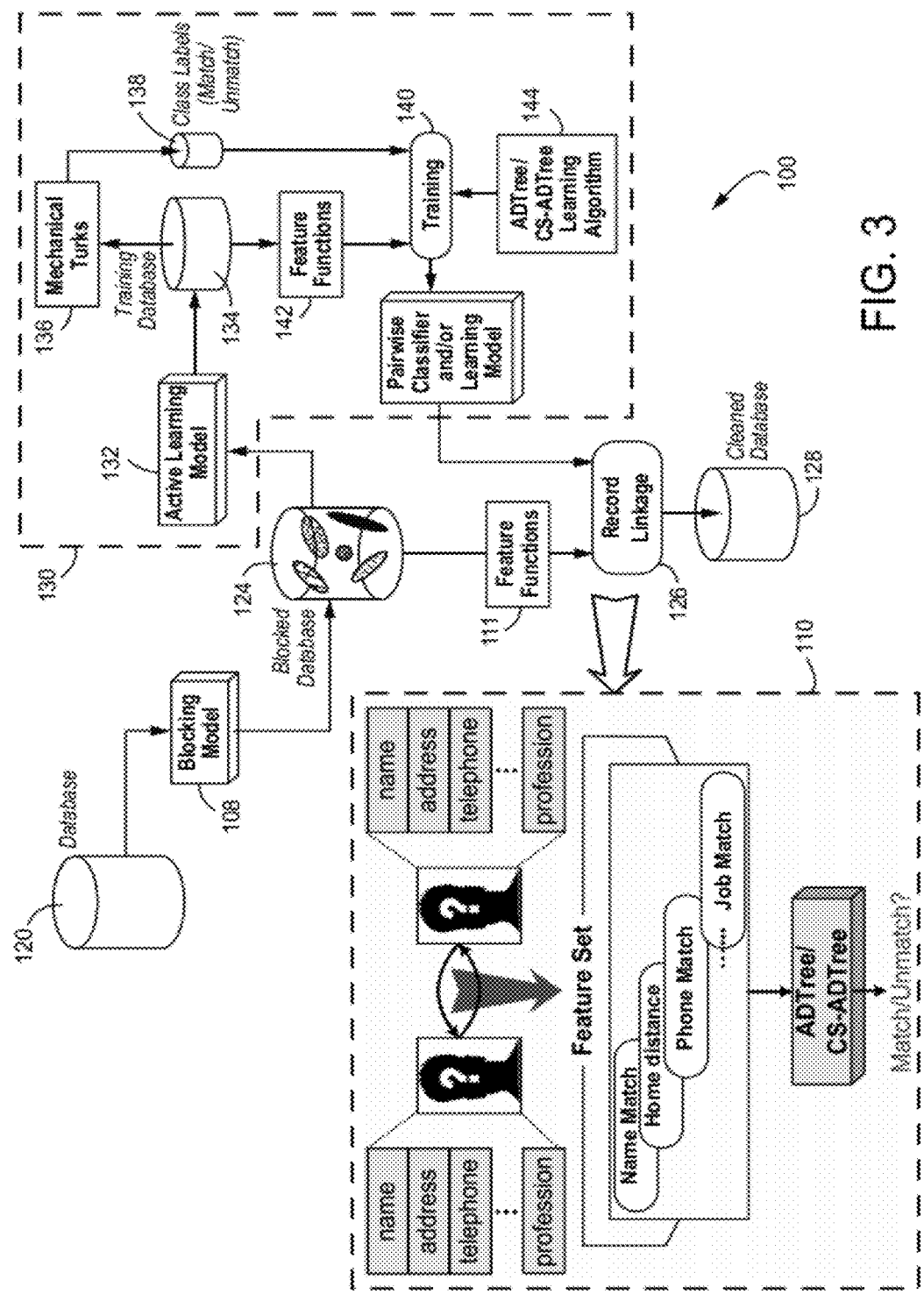
FIG. 3 shows a further illustrative non-limiting data processing system 100 encompassing both execution-time components and training-time components.

FIG. 3 shows a further illustrative example implementation of system 100 encompassing both execution-time components and training-time components. System 100 includes a database 120 that is processed by blocking model 108 to provide a blocked database for further processing by feature functions and record linkage 126 for storage in a cleared database 128. Record linkage 126 in turn is based on a learning model 110 obtained from a machine learning process 130 using an active learning model that operates on the blocked database 124 to develop a training database 134. The training database may use a crowdsourcing methodology which in this illustrative non-limiting example is implemented via Amazon's Mechanical Turk platform, 136, to develop class labels 138 for input into training 140 used to develop the learning model 110. Training 140 may also accept input from additional feature functions 142 and ADTree/CS-ADTree learning algorithm(s) to be described below.

Figure 4:
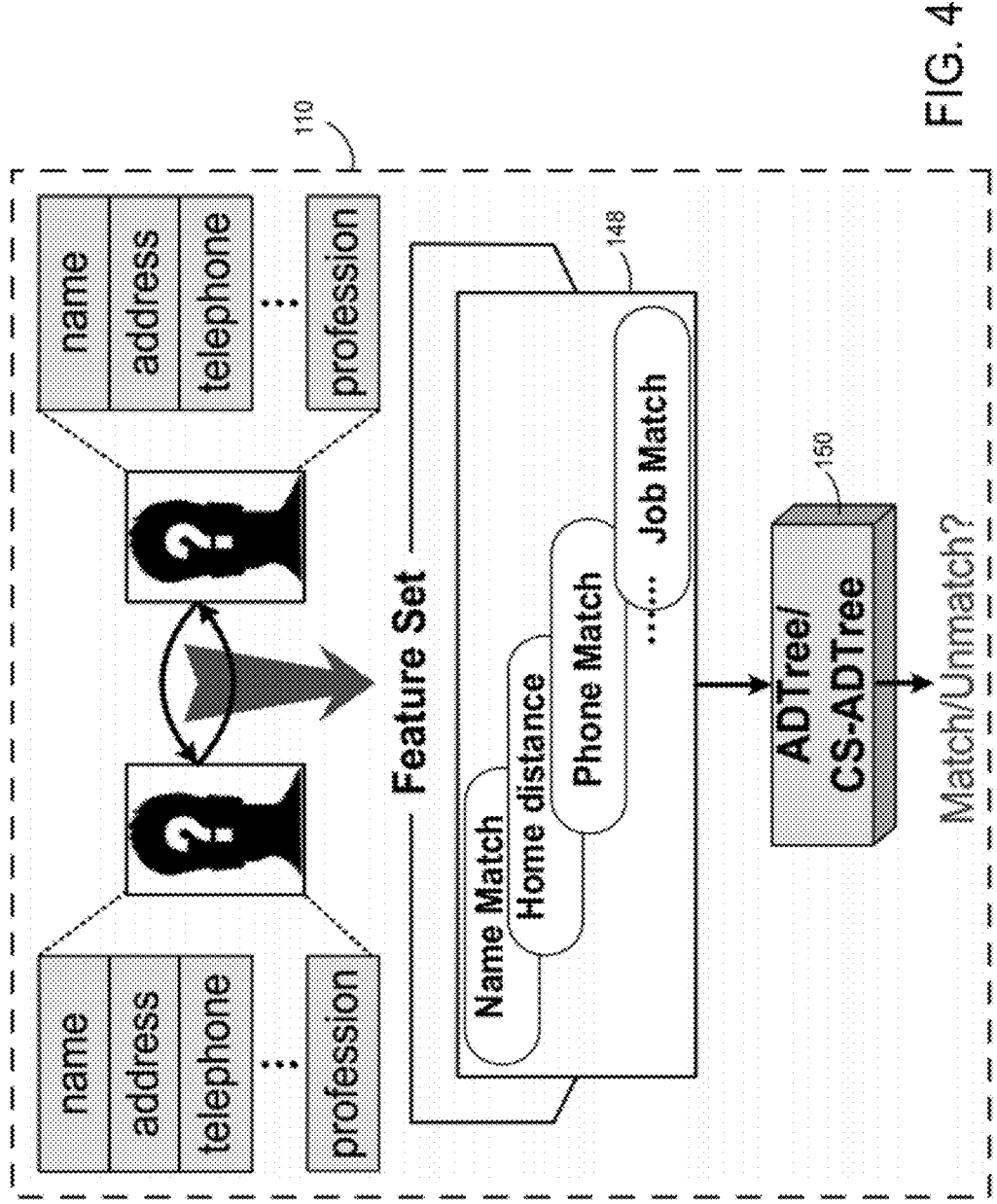
FIG. 4 shows an example non-limiting illustrative "match/unmatch" test using an ADTree/CS-ADTree approach.

An output of record linkage 126 is a match/unmatch block 146 that determines whether two records should be linked. FIG. 4 shows in more detail how two records containing a variety of fields (e.g., name, address, telephone number, profession, etc.) are applied to a feature set 148 through an ADTree/CS-ADTree process 150 to make a "match/unmatch?" determination as to whether the records should be linked or not.

FIG. 5 shows an example of illustrative records that are candidates for linkage based on an illustrative feature set. The illustrative non-limiting fields shown are "Name", "Birthday", Street address", "City/State" and "Phone number." Each record contains the name "Robert Jones" who lives in Seattle Wash. and was born in March of 1966. Note however that the phone numbers are different (same area code, but different numbers), the street addresses are different and the birthdays don't match. Is this the same Robert Jones or a different one? FIG. 5 thus illustrates different person record linkage features. There can be a number of (e.g., over 40) different features that can be a mix of real-valued, integer, Boolean, and categorical (e.g., phone match could be on area code, area code+exchange, or exact match).

Figure 6:
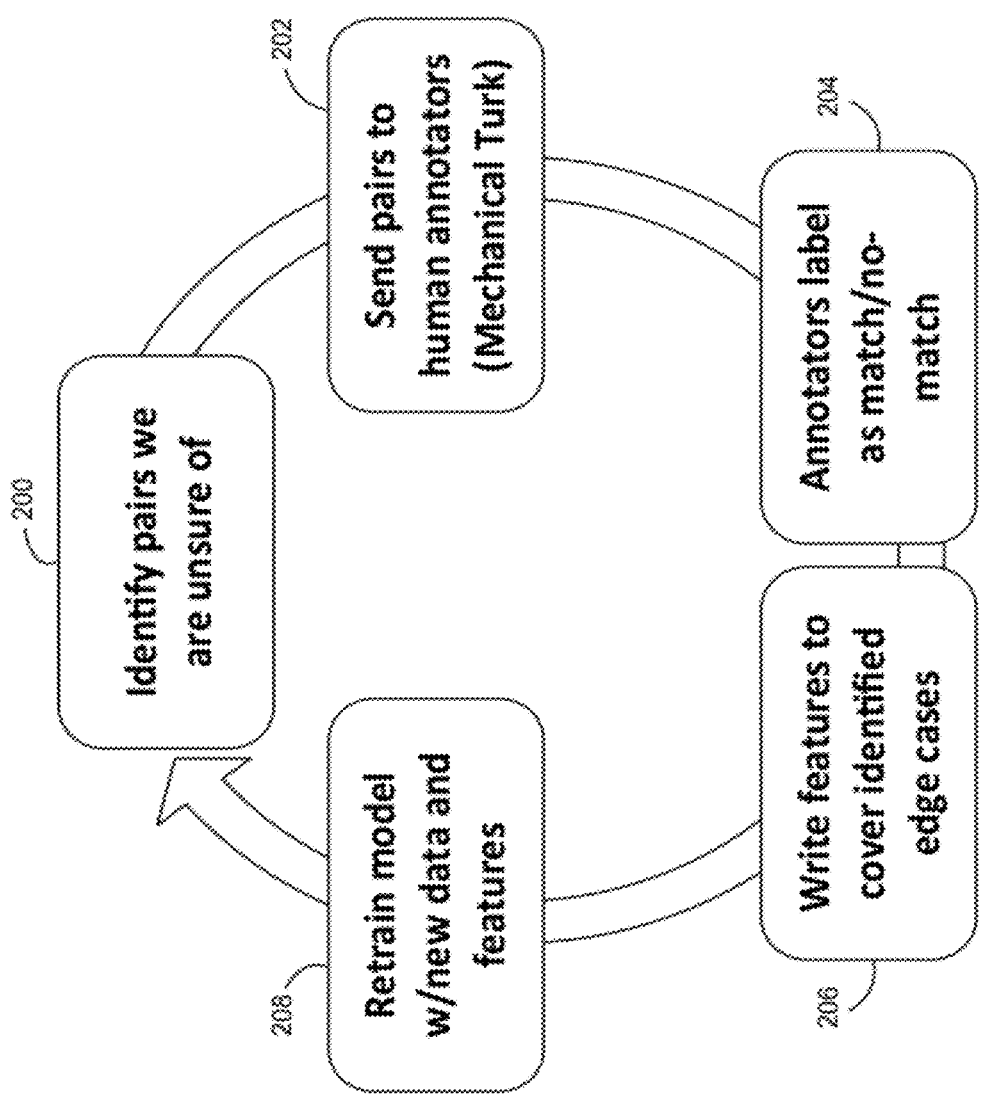
FIG. 6 shows an example non-limiting illustrative Record Linkage Development Cycle.

FIG. 6 shows an exemplary illustrative non-limiting record linkage development cycle. In the non-limiting example shown, we identify pairs we are unsure of (200), send pairs to human annotators ("mechanical turk") (202), have the annotators label the pairs as match/no-match (204), write features to cover identified edge cases (206) and retrain the model with new data and features (208). In addition to the feature set, a focus in our exemplary illustrative non-limiting implementation was to choose an optimal machine learning algorithm for record linkage.

Example Machine Learning Algorithms

Figure 8:
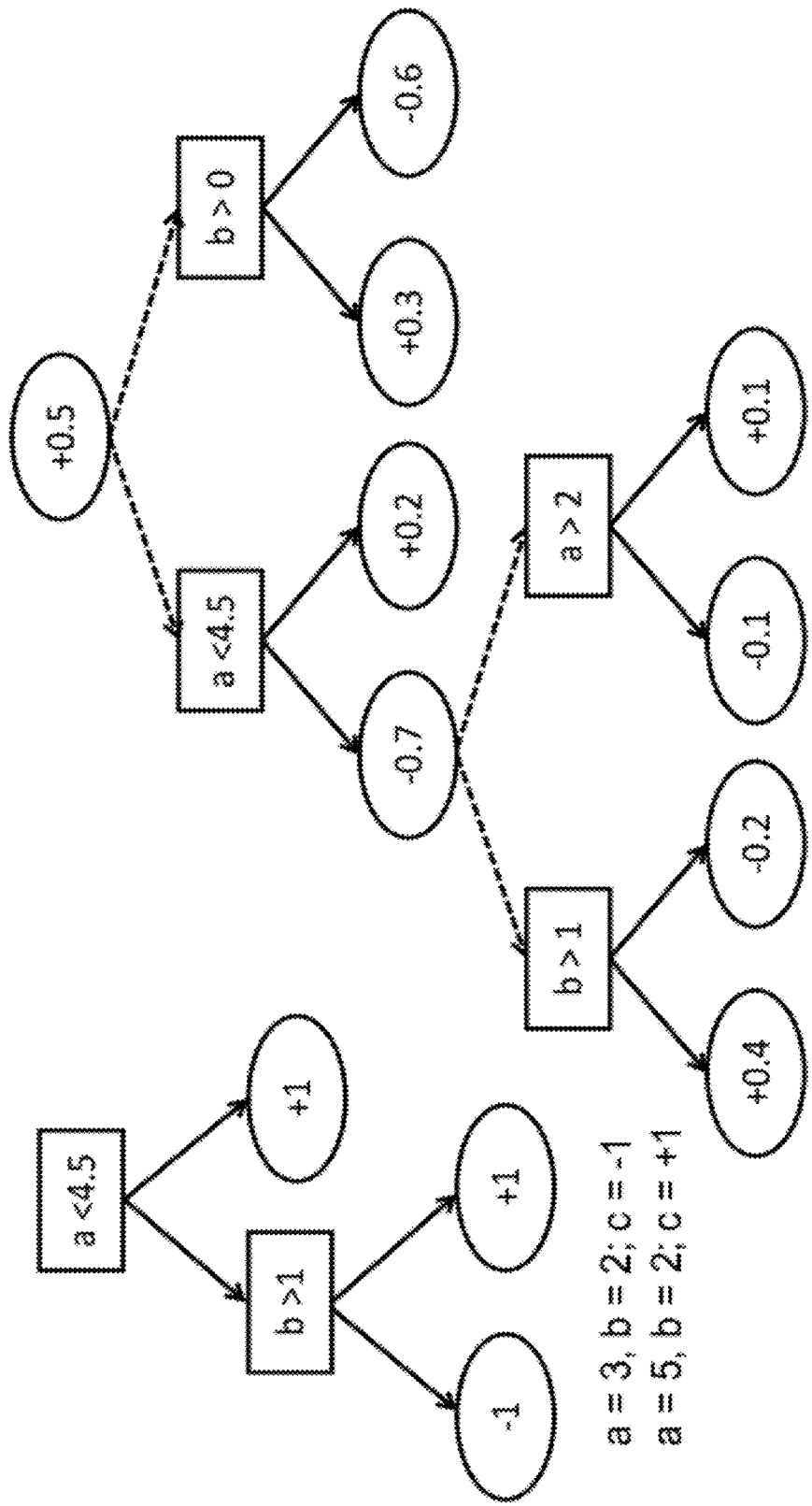
FIG. 8 shows an example alternating decision tree and an example conventional decision tree.

FIG. 7 shows an example non-limiting comparison of different machine learning and record linkage techniques, and FIG. 8 shows an example alternating decision tree and conventional decision tree. ADTrees were described by Freund and Mason, The Alternating Decision Tree Learning Algorithm, *Proceedings of the 16th International Conference on Machine Learning,* 124-133 (1999). They can be characterized as "Decision Trees meet Boosting". A standard boosting algorithm is used, but all features learned are of a certain form. There are two kinds of nodes in illustrative implementations: splitter nodes and prediction nodes. This does not provide binary splits like with a DT–one can have multiple splitter nodes (multiple questions) hanging off of each prediction node. Note that decision trees and alternating decision trees provide good human interpretability, capture feature interactions and handle diverse feature types. However, they do not provide cost sensitivity. On the other hand, cost-sensitive alternating decision trees provide all of these advantages as well as cost-sensitivity.

Cost-Sensitive Learning

One common motivation for cost sensitive learning is the scenario of training a classifier on a data set which contains a significantly unequal distribution among classes. This sort of problem usually consists of relative imbalances and absolute imbalances. Absolute imbalances arise in data sets where minority class examples are definitely scarce and under-represented, whereas relative imbalances are indicative of data sets in which minority examples are well represented but remain severely outnumbered by majority class examples.

A second motivation for cost sensitive learning is when there are different "business costs" (real-world consequences) between false positive and false negative errors. Cost sensitive learning for the binary classification problem can be best illustrated by a cost matrix adhering to data that consists of two classes: positive class P and negative class N. For the sake of convenience, in the rest of this paper we refer to examples/instances belonging to the positive and negative classes as positive examples/instances and negative examples/instances, respectively. In the person record linkage context, a positive example is a pair of records which represent the same person. A negative example is when the pair of records represent two different people.

The cost matrix in FIG. 9 demonstrates the cost of four different scenarios of classifying an instance into either positive class P or negative class N. The correct classifications reside on the diagonal line of the cost matrix and have a cost of 0, i.e., C(P, P)=C(N, N)=0. Traditional reports on Record Linkage work often assign equal costs to misclassifying a positive instance into a negative instance and misclassifying a negative instance into a positive instance, i.e., C(P, N)=C(N, P). This works perfectly fine when the positive class and negative class are of equal interest. Nevertheless, this is rarely true in the real business world. For instance, failure to identify a credit fraud case (a "false negative" error) would bring a much higher expense than the reverse case. On the other hand, in a RL industrial setting, there are also many applications which are more averse to false positives than false negatives. For instance, one illustrative industrial database may drive an application which displays the history of addresses a person had resided at and jobs they had held, among other things. In this business, a false negative would generally mean that we would fail to list a true address or true job title that a person had had. However, it is considered far worse to make a false positive error whereby we would say that a person had lived at an address or held a job that pertained to someone else. Similar business tradeoffs are known where a false positive in record linkage on a children's immunization database can lead to a child not being vaccinated for a dangerous disease, whereas a false negative leads to a child receiving a redundant, but harmless, vaccination.

In other terms, cost sensitivity asks "Do you care more about precision or recall error?" For an airline, a recall error is worse—the airline must identify all possible terrorists who are getting on the plane. For a search engine in contrast, a precision error is worse than a recall error. It is undesirable to falsely mix two people's profiles. Therefore, for search engines in our non-limiting examples, recall at very high precision (99%+) is what we care about. It may be difficult to obtain very high precision without cost sensitivity.

A classifier created for record linkage has the task of classifying a pair of records in a database into match or unmatch. Although academic systems typically target f-measure (the harmonic mean of precision and recall), which weights false positive and false negative errors equally, as discussed previously, some industrial applications typically consider false positives to be much more expensive than false negatives (albeit with exceptions, such as with the airline example cited earlier). Hence industrial systems targeting high precision will frequently seek to maximize recall while ensuring that precision is at least $\pi$ for some $\pi \in [0,1]$. As an example, in one example non-limiting database, there may be a requirement of $\pi \geq 985$, where $\pi = 0.996$ is a typical value. This implies that misclassifying no-match cases, and thus making a false positive error, should be much more expensive than misclassifying match cases (yielding a false negative) in terms of cost, which gives rise to the study of applying cost sensitive learning to tackle record linkage problems.

Illustrative Feature Design

To build a strong record linkage system, coming up with a proper feature representation is highly useful. To accomplish that goal, most existing work concentrates on designing similarity functions estimating the similarity levels between corresponding fields in a pair of records. Although this kind of method can efficiently capture some of the semantic similarity between a pair of records despite various levels of distortions of textual strings, it leaves out some crucial signals. For instance, a rare name match in records should be considered more likely to be a duplicate than a common name match (e.g. two "Hannah Philomene's" are more likely to the same than two "John Smith's"). More generally, our experience is that achieving the highest levels of accuracy requires the design of at least dozens of heterogenous features so that the system can attempt to exploit every possible signal that is detectable by the feature designer. Given these requirements, working with a machine-learning algorithm which produces a human-understandable run-time model greatly facilitates feature development and debugging.

An illustration of one illustrative feature design starts with the example of a pair of person profile records shown in FIG. 10. Although the pair only differs by one character across all fields, it can be clearly identified as a non-match by anyone familiar with American naming conventions, since it is apparent that these two individuals are likely father and son. However, this example would be predicted as a match by many record linkage platforms because of the degree of textual similarity. Our first feature is thus name_suffix, which is a categorical feature with three possible values: match if the name suffixes match (i.e. John Smith Jr. vs. John Smith Jr.), differ if the name suffixes differ, and none if this feature does not apply (e.g. if one or both records do not contain a name suffix).

The second feature is related to name frequency, which is global_name_frequency. It is a numeric feature characterizing frequency of the name in the population. Note that if the names do not match, we consider the feature value in that case to be positive infinite. This feature is negatively correlated to the record linkage decision, i.e., a large value of global_name_frequency would decrease the likelihood that the two records match.

Figure 11:
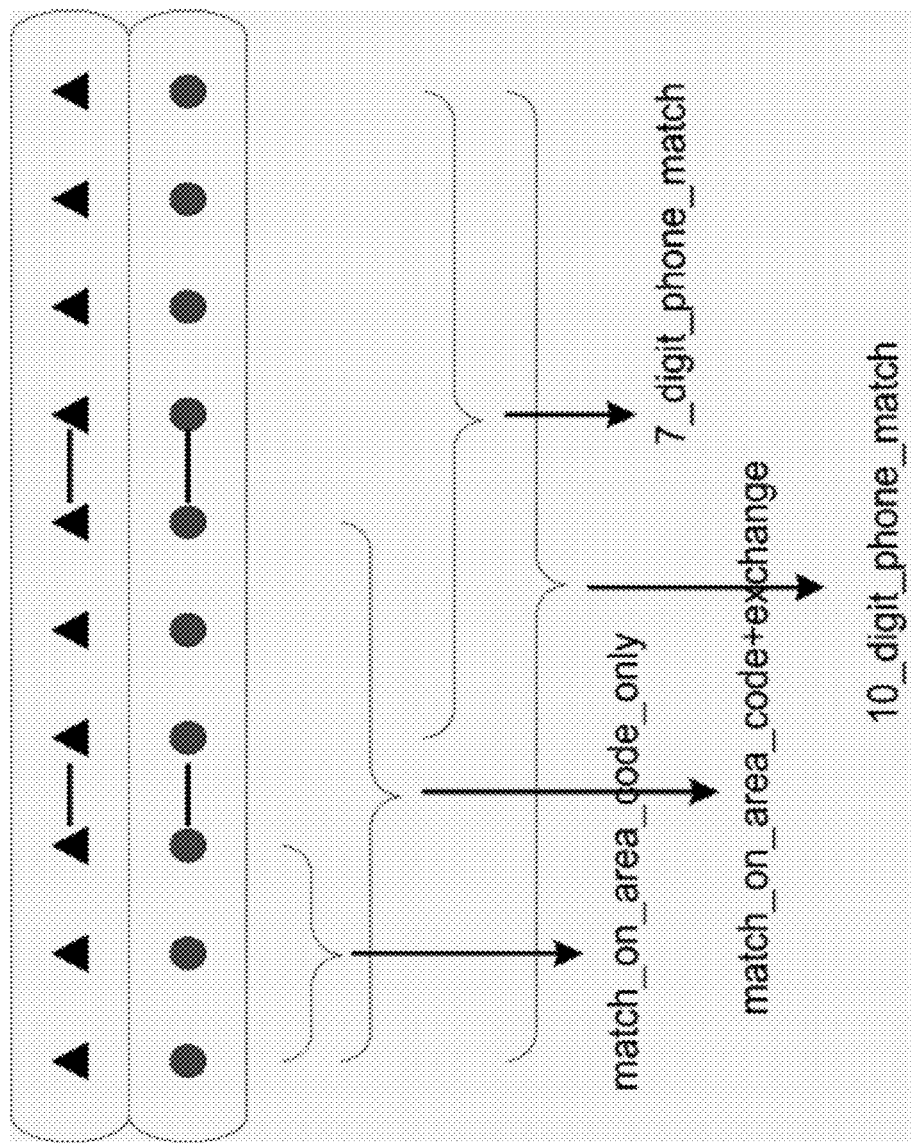
FIG. 11 is a non-limiting illustrative example of feature values of phone_match.

The third feature is telephone number match, i.e., phone_match, which is a categorical feature. US phone numbers can be segmented into three parts. Records matching on different parts or different conjunctions of parts of phone number should be considered duplicates with varied likelihood. Besides a no_match where phone numbers are different in all three parts, FIG. 11 illustrates the other four feature values phone_match can take. The advantage of this feature is that in lieu of determining the cost of variation in different part of phone numbers either manually or adaptively, we directly push the different match scenarios into the ML algorithm as feature values to make the algorithm figure out the appropriate strategy for "ranking" different match cases.

A partial list of other features used in this system include the following:

TABLE 1

Other Non-Limiting Features

| Feature Name | Explanation |
|---|---|
| street_address_match | returns "true" if street name and house number match |
| birthday_difference | returns the number of days separating the birthdays |
| regional_population | returns the population of the region that the two records have in common or positive infinity if not in the same region, (rationale: two records known to share a New York City address are less likely to match than two addresses sharing a Topeka, Kansas address) |
| name_matches | returns number of matching names (rationale: particularly useful for criminal matching, where criminals may match on multiple aliases) |

As can be seen from these feature examples, the construction of a high-precision, industrial-strength record linkage system requires a lengthy list of complex features which are the result of extensive feature engineering. It is thus useful that the illustrative machine learning algorithm supports the feature development process.

Exemplary Illustrative Non-Limiting ML Algorithms
Alternating Decision Trees (ADTrees)

The ADTree algorithm is a combination in a peculiar way of the decision tree and boosting algorithms. There are two kinds of nodes in an ADTree. One is the splitter node which specifies the condition that should be tested for the instance. The other is the prediction node, which assigns a real-valued score to instances satisfying conditions at different points. An ADTree can be split multiple times at any point, i.e., it can attach more than one splitter node at any single prediction node. This is different from a decision tree since (1) generally, a decision tree can only be split once at each point, and (2) the split can only be performed at the bottom of the tree, i.e., the prediction leaves, in the progress of tree generation. Upon determining the class label of an instance, ADTree sums up the score of the prediction nodes of all paths on which the condition specified by the splitter nodes are all satisfied by the instance. The sign of the summation is the class label of the instance. Note that a conventional decision tree also decides the class label of an instance by going through a path in the tree hierarchy. The difference is that there is just one path and only the prediction leaf at the bottom determines the class label of the instance.

Figure 12:
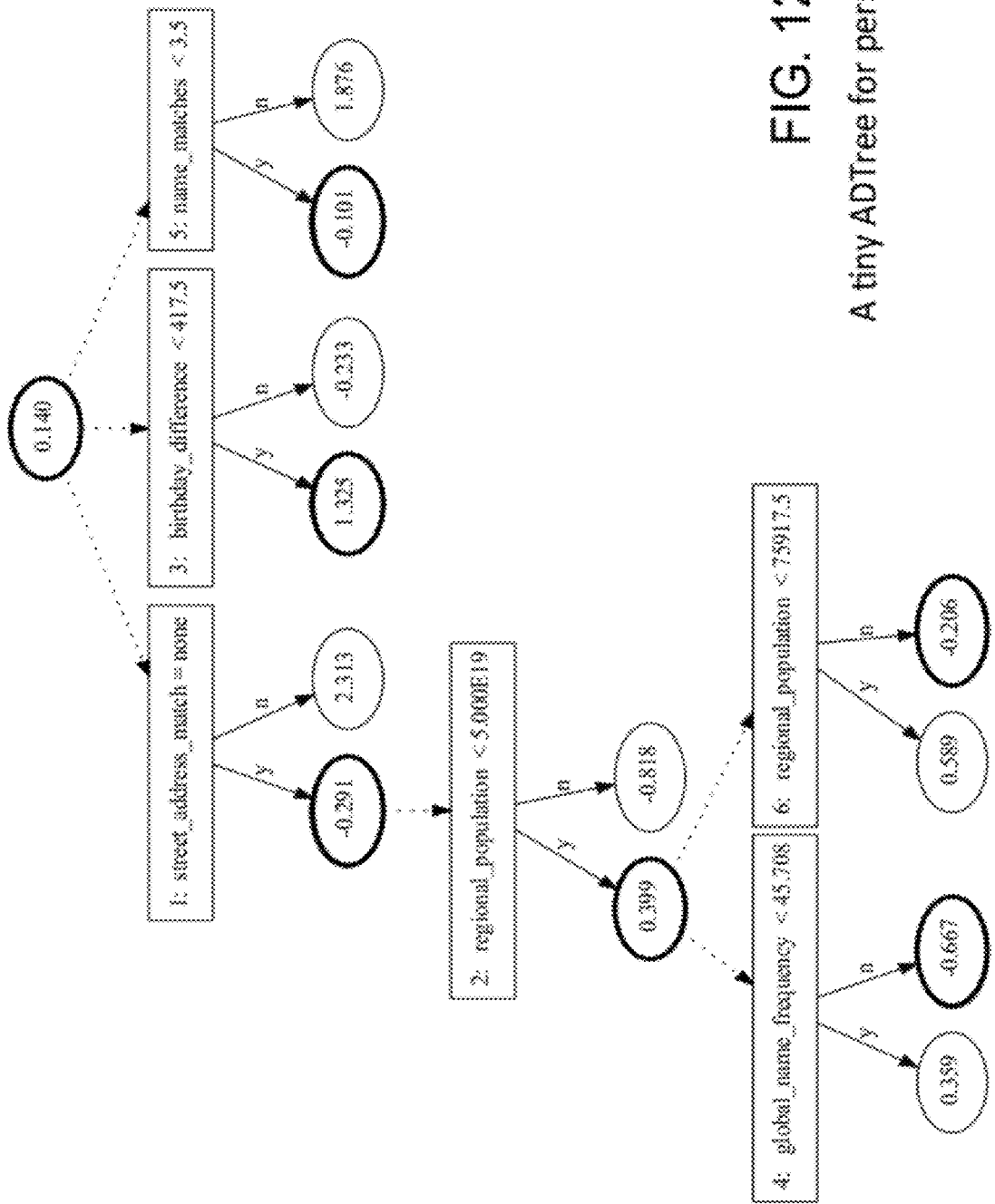
FIG. 12 is a non-limiting illustrative example of a tiny ADTree for person linkage.

A toy example of a person-linking ADTree, shown in FIG. 12, was built from a database of over 50,000 labeled examples consisting of a mixture of criminal and non-criminal person records. There are five features illustrated in this model which were described above. Let's suppose the model is considering the pair of records shown in FIG. 5.

For this example, we first note that the root prediction node starts us off with a score of 0.140. The relatively small positive score indicates a slight predominance of positive ("match") examples in the training corpus. We then see that Feature 1, street_address_match, returns "none" (yes: −0.291), so we test Feature 2, which returns 3.3 million, since that is the population of the Seattle Metropolitan Area. Since feature 2 returned "yes" (+0.399), we now query features 4 and 6. Feature 4 returns 1000, the frequency of "Robert Jones" and thus answers "no" (−0.667), while Feature 6 tests the "regional population" feature again and decides "no" (−0.206), this time since the population is not less than 75,917.5. Feature 3 returns 14, which is less than 417.5, giving a "yes" decision (1.325). Feature 5 returns 1 since there is only one matching name, so the decision is also "yes" (−0.101).

Summing these values, the class label is thus determined through calculating 0.140−0.291+0.399−0.667−0.206+1.325−0.101=0.599, i.e. a relatively low-confidence match. Note also that we can determine the amount of "blame" to assign to each feature by summing the prediction nodes of each feature. Consequently, we can see that "regional_population" contributes 0.399−0.206=0.193 to the final score, which is very helpful in feature engineering.

Finally, note the following two benefits of ADTrees. Firstly, if Feature 1 had returned "no" because street_address_match did not return "none", we would not have tested features 2, 4, and 6, thus reaping a major gain in run-time performance. Secondly, note how the ADTree seamlessly mixed real-valued features with a Boolean feature (street_address_match), a property which simplifies development and facilitates the incorporation of heterogeneous features in a record linkage model.

As a second example, consider the name_suffix feature described above. Due to the importance of this feature, ADTree generally puts it somewhere near the root node. The example in FIG. 5 illustrates this. "name_suffix=differ" is a child of the root node and is the eighth feature chosen. If the name suffix differs, we decrease the score (making a match less likely) by −2.89 and don't query any additional features. On the other hand, if the suffixes don't differ, the score is basically unaffected (adding 0.039 is trivial in the context of the other, much larger values) and we query many other features. Note that one additional feature is whether "name_suffix=match", which gets a strong positive value of 1.032 if true.

TABLE 2

An example comparison of two records

| | Record 1 | Record 2 | Comment |
|---|---|---|---|
| Name | Robert Jones | Robert Jones | Name Frequency = 1000 |
| Birthday | Mar. 1, 1966 | Mar. 15, 1966 | Birthday difference = 14 |
| Address | 121 Walnut St. | 234 Chestnut St. | |
| City/State | Seattle, WA | Seattle, WA | Population of Seattle region = c. 3.3 million |

Cost Sensitive Alternating Decision Tree

We formulate a novel implementation of ADTree equipped with cost sensitive learning, called Cost Sensitive Alternating Decision Tree (CS-ADTree). This example non-limiting adaptation of ADTree provides a framework of cost sensitive learning and also applies a cost sensitive ML technique to the problem of record linkage.

Cost sensitive learning additionally assigns a cost factor $c_i \epsilon (0, \infty)$ to each example $x_i, y_i$ in the database to quantify the cost of misclassifying $x_i$ into a class label other than $y_i$. In the standard boosting algorithm, the weight distribution over the data space is revised in an iterative manner to reduce the total error rate. Cost sensitive learning operates in a similar manner, but it operates over a space of examples in which the weight distribution has been updated in a biased manner towards examples with higher costs. According to the "translation theorem", the classifier generated in this way will be conceptually the same as the one that explicitly seeks to reduce the accumulated misclassification cost over the data space. We will examine three different methods of biasing the training data to account for the business preference for false negatives vs. false positives. The baseline weight update rule of ADTree is, $$w_i^{t+1} \leftarrow w_i^t \cdot e^{-r_t(x_i)y_i}$$

In the illustrative methods herein, AdaC2, the weight update rule for ADTree is modified as, $$w_i^{t+1} \leftarrow c(i) \cdot w_i^t \cdot e^{-r_t(x_i)y_i}$$

where $c(i)=c_+ \cdot I(y_i=+1)+c_- \cdot I(y_i=-1)$

The intuition here is straightforward. We hope weights of the examples with higher costs are increased faster than those with lower costs. According to Lemma 1 (listed below), the learning focus of ADTree will be biased towards examples with higher costs.

---

Lemma 1. The creation of a splitter node is approximately optimized if:
$Z = 2(\sqrt{W+(d_1 \cap d_2)W-(d_1 \cap d_2)} + \sqrt{W+(d_1 \cap \neg d_2)W-(d_1 \cap \neg d_2)}) +$
$W(\neg d_1)$ is minimized subject to $d_1 \in \mathcal{P}$ and $d_2 \in \mathcal{D}$.
PROOF:
$Z = 2(\sqrt{W+(d_1 \cap d_2)W-(d_1 \cap d_2)} + \sqrt{W+(d_1 \cap \neg d_2)W-(d_1 \cap \neg d_2)}) +$
$W(T) - W(d_1)$
Since $W(T)$ is the same for pair-wise combination of $d_1$ and $d_2$, it can be omitted from the Z equation.
$\rightarrow$
$Z = 2(\sqrt{W+(d_1 \cap d_2)W-(d_1 \cap d_2)} + \sqrt{W+(d_1 \cap \neg d_2)W-(d_1 \cap \neg d_2)}) - (W + (d_1 \cap d_2) + W + (d_1 \cap \neg d_2)) + W - (d_1 \cap d_2) + W - (d_1 \cap \neg d_2)$
$\rightarrow$
$Z = -[(\sqrt{W+(d_1 \cap d_2)} - \sqrt{W-(d_1 \cap d_2)})^2 + (\sqrt{W+(d_1 \cap \neg d_2)} - \sqrt{W-(d_1 \cap \neg d_2)})^2]$

---

Since $\sqrt{w_+(d_1 \cap d_2)}$, $\sqrt{w_-(d_1 \cap d_2)}$, $\sqrt{w_+(d_1 \cap \neg d_2)}$, $\sqrt{w_-(d_1 \cap \neg d_2)}$ are all greater than 0, Z is minimized when the following two conditions are both satisfied:

1. Absolute difference between $\sqrt{w_+(d_1 \cap d_2)}$ and $\sqrt{w_-(d_1 \cap d_2)}$ is maximized.
2. Absolute difference between $\sqrt{w_+(d_1 \cap \neg d_2)}$ and $\sqrt{w_-(d_1 \cap \neg d_2)}$ is maximized.

This means examples reaching conditions $d_1 \cap d_2$ or $d_1 \cap \neg d_2$ are largely from just one class. In an extreme case, if all weights are exactly the same, like in first iterative round, and the number of examples reaching $d_1 \cap d_2$ or $d_1 \cap \neg d_2$ is fixed, minimizing Z would result in a perfect split. Q.E.D.

Corollary 1. Precondition $d_1$ and condition $d_2$ that maximize the Z create a suboptimal split.
Proof:
Following Lemma 1, Z can be maximized when the following two conditions are both satisfied:

$$\sqrt{w_+(d_1 \cap d_2)} = \sqrt{w_-(d_1 \cap d_2)} \qquad 1.$$

$$\sqrt{w_+(d_1 \cap \neg d_2)} = \sqrt{w_-(d_1 \cap \neg d_2)} \qquad 2.$$

This means the number of positive examples and negative examples reaching conditions $d_1 \cap d_2$ or $d_1 \cap \neg d_2$ should be close to each other to get Z to approach 0. An observer at this point can conclude little knowledge regarding the class label information of the instance reaching this point, which means the split is suboptimal. In an extreme case, when weights of all examples are the same, like in first iterative round, the number of positive and negative examples reaching $d_1 \cap d_2$ or $d_1 \cap \neg d_2$ are exactly matched. The split concludes no knowledge and thus is a worst one. Q.E.D.

Given the modified weight update rule, the original equation for calculating scores $\alpha_1$ and $\alpha_2$ at each iterative round no longer guarantees the error rate could be decreased fastest. Inspired by the induction of optimized $\alpha$ for AdaC2, $\alpha_1$ and $\alpha_2$ can be modified to $$\alpha_1 = \frac{1}{2}\ln\frac{c_+ W_+(d_1 \cap d_2)}{c_- W_-(d_1 \cap d_2)}$$

and $$\alpha_2 = \frac{1}{2}\ln\frac{c_+ W_+(d_1 \cap \neg d_2)}{c_- W_-(d_1 \cap \neg d_2)}$$

Now that we have modified the weight update rule and equations for calculating prediction scores $\alpha_1$ and $\alpha_2$, we formulate CS-ADTree in Algorithm 2 below.

---

Algorithm 2 Cost Sensitive Alternating Decision Tree

Inputs:
1:    database $S = \{(x_1, y_1, c_1), \ldots, (x_n, y_n, c_n)\}$, where $x_i \in X$, $y_i \in \{-1, +1\}$, and $c(i) = c_+ \cdot I(y_i = +1) + c_- \cdot I(y_i = -1)$.
2:    weights $W = \{w_1^0, \ldots, w_n^0\}$, where $w_i^0 = 1$.
     /* uniform distribution initially */
3:    $D \leftarrow \{\text{all possible conditions}\}$.
4:    $N \leftarrow$ Number of iterative rounds.
5:    $\eta \leftarrow$ smooth factor.
Procedure:
6:    $r_0 \leftarrow T$ with score $\frac{1}{2}\ln\frac{c_+ \cdot W_+(T) + \eta}{c_- \cdot W_-(T) + \eta}$ /* T: precondition is true for all examples. */
7:    $P_0 \leftarrow r_0$ /* precondition set */
8:    for t: 1 $\rightarrow$ N do
9:
     $d_1, d_2 = \underset{d_1 \cdot d_2}{\operatorname{argmin}}(Z)$
     s.t. $Z = [2(\sqrt{W_+(d_1 \cap d_2)W_-(d_1 \cap d_2)} + \sqrt{W_+(d1 \cap \neg d2)W_-(d1 \cap \neg d2)}) + W(\neg d_1)]$
     $d_1 \in P_t, d_2 \in D$
10:    $\alpha_1 = \frac{1}{2}\ln\frac{c_+ \cdot W_+(d_1 \cap d_2) + \eta}{c_- \cdot W_-(d_1 \cap d_2) + \eta} \rightarrow d_1 \cap d_2$ /* $\alpha_1$ is the score associated with $d_1 \cap d_2$ */
11:    $\alpha_2 = \frac{1}{2}\ln\frac{c_+ \cdot W_+(d_1 \cap \neg d_2) + \eta}{c_- \cdot W_-(d_1 \cap \neg d_2) + \eta} \rightarrow d_1 \cap \neg d_2$ /* $a_2$ is the score associated with $d_1 \cap \neg d_2$ */
12:    $r_t \leftarrow d_1 \cap d_2 \oplus d_1 \cap \neg d_2$
     /* $r_t(x)$ is a new splitter node with two associated prediction nodes. */
13:    $P_{t+1} \leftarrow \{P_t, r_t\}$
14:    $w_i^{t+1} \leftarrow c(i) \cdot w_i^t \cdot e^{-r_t(x_i)y_i}$
     /* update example weights */
15:    end for
16:    return Classifier for unseen unlabeled instances:

$$H(x) = \operatorname{sgn}\left(\sum_{t=0}^{N} r_t(x)\right)$$

---

Adaptive Boosting

Since ADTree shares many similarity with boosting, we would like to firstly introduce Ada.Boost, the most popular boosting algorithm, in brief for better understandability of AD Tree. Algorithm I gives the procedure of applying Ada. Boost to derive the classifier H(x) from database S. A weight distribution W is maintained to sample database S into training data set $S_t$ at each round. It is initially a uniform distribution, which means all examples are equally likely to be selected into the first sampled data set $S_1$. At each round $t_1$, the weak hypothesis $h_t$ i.e., trained classifier, is generated by training the base learner L, on the sampled data set $S_t$. Then, the weighted error $\epsilon_t$ is calculated through summing the weights of the instances in S that are misclassified by $h_t$. Provided the weak classifier $h_t$, performs at least slightly better than a random guess on classifying S, i.e., $\epsilon_t > 0.5$, it is guaranteed that $\alpha_t > 0$. Based on this, the weight distribution W is updated for the next iterative round by decreasing the weights of the correctly classified examples and increasing the weights of the misclassified examples both with a factor of $\epsilon^{\alpha_t}$. Since hard-to-learn examples are prone to be misclassified, their weights are therefore effectively increased with the progress of iterative weights updating. In other words, the proportion of difficult examples in the training data set for creating the weak hypothesis is guaranteed to be increasing. After AdaBoost exhausts N iterative rounds, it outputs the final classifier which is basically a set of N generated hypotheses. The prediction of final hypothesis on an unlabeled instance is a majority voting of the classes predicted by the individual hypotheses weighted by $\alpha_t$. $\alpha_t$ is monotonically increased with the decrease of $\epsilon_t$, therefore it is also considered as a margin of the hypothesis $h_t$ and can be used to weigh $h_t$ in voting for classifying instances $x \in \chi$.

It is known that AdaBoost can achieve arbitrary low error rate on training data set as long as enough iterative rounds can be guaranteed. Furthermore it was empirically discovered that AdaBoost has no issue of overfitting to the training data set even with an extremely large number of iterative rounds. Schapire et al, *Boosting the margin: A new explanation for the effectiveness of voting methods*, The Annals of Statistics, 26(5):16511685, 1998) later introduced the margin theory to explain this amazing yet a bit counter-intuitive property of AdaBoost. From the practical point of view, the beauty of the illustrative non-limiting AdaBoost technique is that the classification performance of a weak classifier can be significantly improved by creating and combining an ensemble set of such weak classifiers through the procedure of AdaBoost. Boosting a decision tree can yield very good classifiers. A problem is, however, the classification rules concluded by boosting decision trees through AdaBoost may lack the intuitive interpretability by human beings, which is a most desirable but non-limiting property of decision tree learning algorithms.

Alternating Decision Tree

ADTree is a new combination of decision tree with boosting. It inherits the learning capability of boosting, and is easy and intuitive to be interpreted for its structural representation of base classification rules in a visualized fashion similar to decision tree. There are two kinds of nodes in ADTree. One is the splitter node which specifies the condition that should be tested for the instance. The other is the prediction node which assigns a real-valued score to instances satisfying conditions at different points. An ADTree can be split multiple times at any part, i.e attach more than one splitter node at any single prediction node. This is different from decision tree since firstly, decision tree can only be split at most once at each part and secondly, the split can be only performed at bottom of the tree, i.e., the prediction leaves. Upon determining the class label of an instance, the illustrative ADTree sums up the score of the prediction nodes of all paths on which the condition specified by the splitter nodes are all satisfied by the instance. The sign of the summation is the class label of the instance. Note that a conventional decision tree also decides the class label of an instance by going through a path in the tree's hierarchy. The difference is that there is just one path and the only the prediction leaf at the bottom determines the class label of the instance.

---

Algorithm 1 AdaBoost

Inputs:
1: database $S = \{(x_1, j_1), \ldots, (x_n, y_n)\}$, where $x_i \in X$, $y_i \in \{-1, +1\}$.

2: weights $W = \{w_1^0, \ldots, w_n^0\}$, where $w_i^0 = \frac{1}{n}$.

▷ uniform distribution initially
3: Base Learner L.
4: N ← Number of iterative rounds.

Procedure:
5: for t: 1 → N do
6: $S_t \leftarrow S \times W$ ▷ sample from S using W
7: $h_t = L(S_t)$, s.t. $h_t: X \rightarrow \{-1, +1\}$.
▷ training hypothesis $h_t$ using $S_t$ 8: $$\epsilon_t = \sum_{i:h_t(x_i) \neq y_i} w_i^t$$

▷ weighted error of $h_t$ on classifying S

9: $$\alpha_t = \frac{1}{2} \ln\left(\frac{\epsilon_t}{1 - \epsilon_t}\right)$$

10: $$w_i^{t+1} = w_i^t \cdot \frac{\exp(-\alpha_t y_i h_t(x_t))}{Z_t}, \text{ s.t. } \sum_{i=1}^n w_i^{t+1} = 1$$

11: end for
12: return classifier for unseen unlabeled instances:

$$H(x) = \text{sgn}\left(\sum_{t=1}^N \alpha_t h_t(x)\right)$$

---

The cost factor c(i) can also be put in other spots of the weight update equation. For instance, it can be put inside the exponential term $e^{-r(x_i)y_i}$. When example x is misclassified by $r_t$, we have sgn-$r_t(x_i)y_i > 0$. A high cost inside the exponential term would thus increase the weight of the example in exponential order. This is the idea of illustrative AdaC1. Its weight update rule and prediction score equations of AdaC1 can be adapted for ADTree as, $$w_i^{t+1} \leftarrow w_i^t \cdot e^{-c(i)r_t(x_i)y_i}$$

$$\alpha_1 = \frac{1}{2} \ln \frac{W(d_1 \cap d_2) + c_+ \cdot W_+(d_1 \cap d_2) - c_- \cdot W_-(d_1 \cap d_2)}{W(d_1 \cap d_2) - c_+ \cdot W_+(d_1 \cap d_2) + c_- \cdot W_-(d_1 \cap d_2)}$$

$$\alpha_2 = \frac{1}{2} \ln \frac{W(d_1 \cap \neg d_2) + c_+ \cdot W_+(d_1 \cap \neg d_2) - c_- \cdot W_-(d_1 \cap \neg d_2)}{W(d_1 \cap \neg d_2) - c_+ \cdot W_+(d_1 \cap \neg d_2) + c_- \cdot W_-(d_1 \cap \neg d_2)}$$

The cost factor can also be put both inside and outside the exponential term in the weight update equation, which gives rise to illustrative AdaC3. Its weight update rule and prediction score equations can be adapted for ADTree as, $$w_i^{t+1} \leftarrow c(i) \cdot w_i^t \cdot e^{-c(i) \cdot r_t(x_i) y_i}$$

$$\alpha_1 = \frac{1}{2} \times \ln \frac{c_+ \cdot W_+(d_1 \cap d_2) + c_- \cdot W_-(d_1 \cap d_2) + c_+^2 \cdot W_+(d_1 \cap d_2) - c_-^2 \cdot W_-(d_1 \cap d_2)}{c_+ \cdot W_+(d_1 \cap d_2) + c_- \cdot W_-(d_1 \cap d_2) - c_+^2 \cdot W_+(d_1 \cap d_2) + c_-^2 \cdot W_-(d_1 \cap d_2)}$$

$$\alpha_2 = \frac{1}{2} \times \ln \frac{c_+ \cdot W_+(d_1 \cap \neg d_2) + c_- \cdot W_-(d_1 \cap \neg d_2) + c_+^2 \cdot W_+(d_1 \cap \neg d_2) - c_-^2 \cdot W_-(d_1 \cap \neg d_2)}{c_+ \cdot W_+(d_1 \cap \neg d_2) + c_- \cdot W_-(d_1 \cap \neg d_2) - c_+^2 \cdot W_+(d_1 \cap \neg d_2) + c_-^2 \cdot W_-(d_1 \cap \neg d_2)}$$

Despite the fact that cost sensitive learning can manifest itself in different forms in boosting, we chose to create CS-ADTree in one illustrative non-limiting implementation by integrating AdaC2 into ADTree's training procedure since the weight updating rule of AdaC2 weighs each example by its associated cost item directly, which naturally fits the algorithm into the realm of the translation theorem. In addition, our preliminary empirical studies showed that AdaC2 performed the best across a number of benchmarks.

Example Non-Limiting Evaluation Parameters

Figures 13, 14:
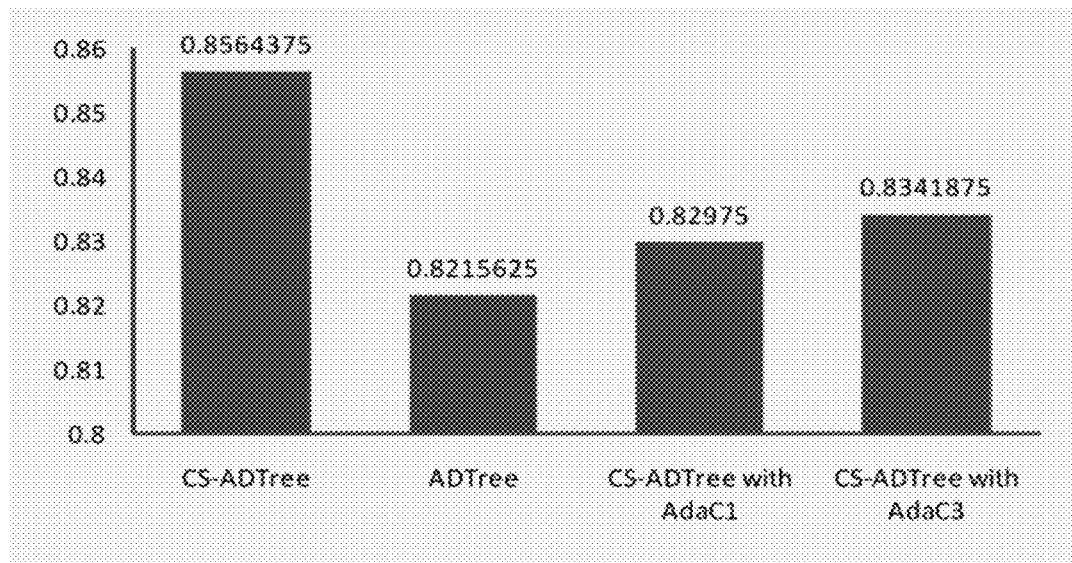
FIG. 13 is a non-limiting illustrative example of a confusion matrix for binary classification.
FIG. 14 is a non-limiting illustrative comparison of average's for ADTree/CS-ADTree.

Most of the time the metrics for evaluating a classifier's performance on record linkage problem are precision, recall and their harmonic mean, f-measure—metrics obtained by fixing the classifier's decision threshold to zero. A confusion matrix shown in FIG. 13 is always helpful to fully capture what these metrics stand for. A quick impression is that a confusion matrix is very similar to a cost matrix. The difference is that what resides in the matrix is the number. of instances satisfying the scenario specified by the row and column indexes. Therefore (True Positive) and (True Negative) are the number of correctly classified positive and negative instances, respectively. FP (False Positive) and FN (False Negative) are the number of instances falsely classified into positive class and negative class, respectively. Considering a matched pair of records as a positive example, and an unmatched pair of records as a negative example, precision, recall, and f-measure for record linkage are defined as, $$\text{precision} = \frac{TP}{TP + FP}$$

$$\text{recall} = \frac{TP}{TP + FN}$$

$$f\text{-measure} = \frac{2 \cdot \text{precision} \cdot \text{recall}}{\text{precision} + \text{recall}}$$

From the definitions, precision measures the accuracy of a classifier's predictions of positive instances, while recall tests the completeness of a classifier's coverage of real positive instances. It is clear that there is a trade-off between precision and recall. This can be seen by the explanation that if all instances are frivolously predicted as positive, recall is maximized to be 1, whereas precision is equal to the proportion of positive examples in the database, which can be very bad in some illustrative circumstances. To this end, f-measure is frequently used to measure the overall performance of a classification algorithm when the relative importance of recall and precision are evenly balanced.

Customization of Evaluation Metrics

Good performance at a single threshold such as zero may lead to unwanted subjectivity. Recent studies show that the performance of a classifier should be evaluated upon a range of thresholds. An appealing property of ADTree is that instead of merely outputting a hard class label, it gives a score value, $$\sum_{t=0}^{N} r_t(x),$$

to estimate the confidence level of its decision. While ADTree generally uses the sign function to classify unlabeled instances, other numerical value can also be used to serve as the threshold. In this case, the classifier of ADTree can be represented as $$\mathcal{H}(x) = \text{sgn}\left(\sum_{t=0}^{N} (r_t(x)) - d\right),$$

where $d \neq 0$. Since the business priority for the industrial database on which we were working was to keep precision above a threshold which was in excess of 99%, precision in a high range was of much more interest to us and we thus focused on metrics other than f-measure. In this example non-limiting implementation, we start by setting the threshold, d, to be large enough to make precision=1, and then tune down the threshold to progressively decrease precision down to 0.985 in steps of 0.001 to determine the recall that we are able to achieve at varying high precision levels.

Choice of Cost Ratio

Some business applications do have strategies to decide costs for different examples. For instance, the amount of money involved in a transaction can be used to quantify the cost related to it. Nevertheless for many other applications such as record linkage, the only prior knowledge available is often the biased interest towards one class over the other. In industrial applications, this is usually expressed as a requirement that the precision be at least $\pi$, where in our applications, we generally had $\pi \geq 0.985$ and a more typical requirement for $\pi$ was in excess of 0.995. Note that two parameters influence the precision of the classifier, the cost factor, C, and the required precision, $\pi$. We have found that a reasonable heuristic is to adjust your cost factor C so that the threshold, d, that yields your desired precision, $\pi$ is close to 0, this generally yields close to optimal recall at $\pi$. We give an informal theoretical justification for this heuristic below.

Non-Limiting Example

Objectives

The following provides experimental results of ADTree and CS-ADTree for comparing records of person profile databases. The objectives here are to 1. demonstrate the effectiveness of ADTree and CS-ADTree on classifying pairs of record into match/unmatch for record linkage; 2. illustrate how the run-time representation of ADTree can enable humans' interpretation of the classifier derived by ADTree; 3. demonstrate the competitiveness of ADTree/CS-ADTree with alternative ML techniques heavily used by most existing record linkage frameworks; and 4. Show how CS-ADTree demonstrates superior performance to ADTree at both very high precision requirements.

Non-Limiting Implementation

ADTree, CS-ADTree, boosted decision tree, and decision tree algorithms are all implemented based on the JBoost platform. The SVM algorithm is implemented based on SVM-Light.

Performance of ADTree/CS-ADTree

In one non-limiting example, we used a database S with match/unmatch labels assigned by expert internal annotators which had 20,541 pairs of person profile records characterized by more than 42 features including those described above. Since the cost of hiring experts is relative high, we later switched to Amazon's Mechanical Turk (MT) System which provides a significantly cheaper and faster way to collect label data from a broad base of non-expert contributions over the web. A drawback of this method is that the database is likely to become noisy since it is possible that some workers on MT ("Turkers") are purely spammers and some are lacking in the necessary domain knowledge for the task.

We report average results for a 10-fold cross validation. For these initial experiments, we held the number of boosting iterative rounds, $T$, fixed at 200 and we used a cost factor of C=4 based on earlier experiments showing these to be optimal values over the precision range [0.985,1].

Figure 15:
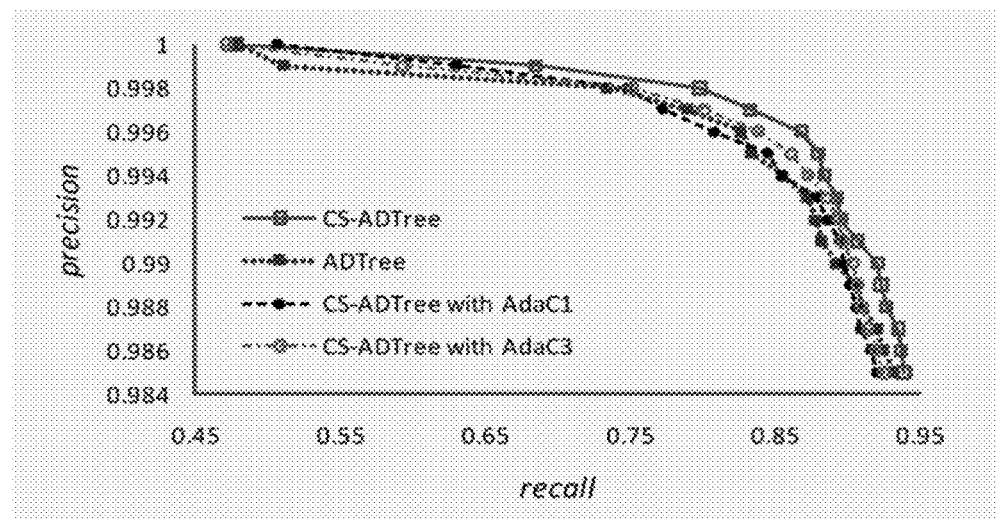
FIG. 15 is a non-limiting illustrative example of Precision-Recall curves of ADTree/CS-ADTree.

With T and C determined, the record linkage performance of CS-ADTree, ADTree, and CS-ADTree with cost-sensitive learning frameworks of AdaC1 and AdaC3 on our initial person profile database S are studied. Their average recall are given in FIG. 14, which clearly shows that CS-ADTree performs the best across all methods under comparison. Average recall can sometimes be misleading when the physical P-R curves of two methods under comparison cross in P-R space. In this case, it would be nonsensical to conclude one method is better than the other based on the area under P-R curve which is conceptually equal to the averaged recall. To that end, we also plot P-R curves of all methods under comparison in FIG. 15. One can clearly see that CS-ADTree can consistently contain other methods in terms of P-R curve, which validates the supremacy of CS-ADTree.

Figure 16:
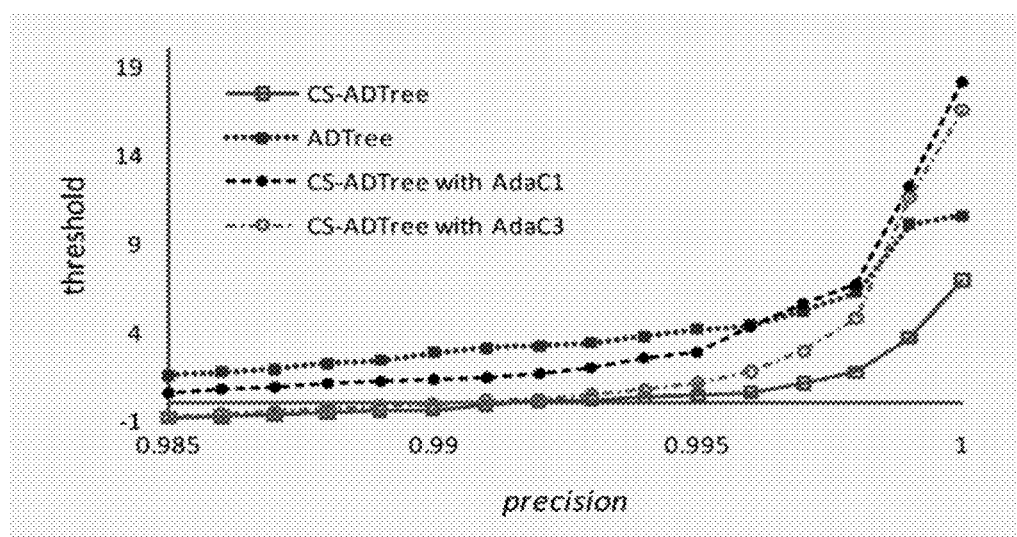
FIG. 16 is a non-limiting illustrative example of threshold range of ADTree/CS-ADTree with respect to high range.

One perspective on how CS-ADTree is able to achieve this superior performance can be seen in FIG. 16. CS-ADTree achieves a given level of precision at a much lower threshold than the other three methods. It is particularly instructive to look at CS-ADTree as compared to ADTree. CS-ADTree achieves 0.995 precision at a threshold of roughly 0, while ADTree achieves this at about 4. An intuition as to CS-ADTree's superiority is that the model is seeking to push positive examples to have scores above 0 and negative scores below 0. In the case of CS-ADTree, we are able to put our threshold, d, at about the same threshold as the model's threshold, whereas with ADTree, the model is not "aware" that the threshold of interest to us is 4. In summary:

Setting threshold at c. 4.0 in ADTree gives 99.5% precision
ADTree treats false positives and false negatives equally
CS-ADTree achieves 99.5% precision at c. 0.0
CS-ADTree algorithm is optimizing relative to 0.0

Figure 17A:
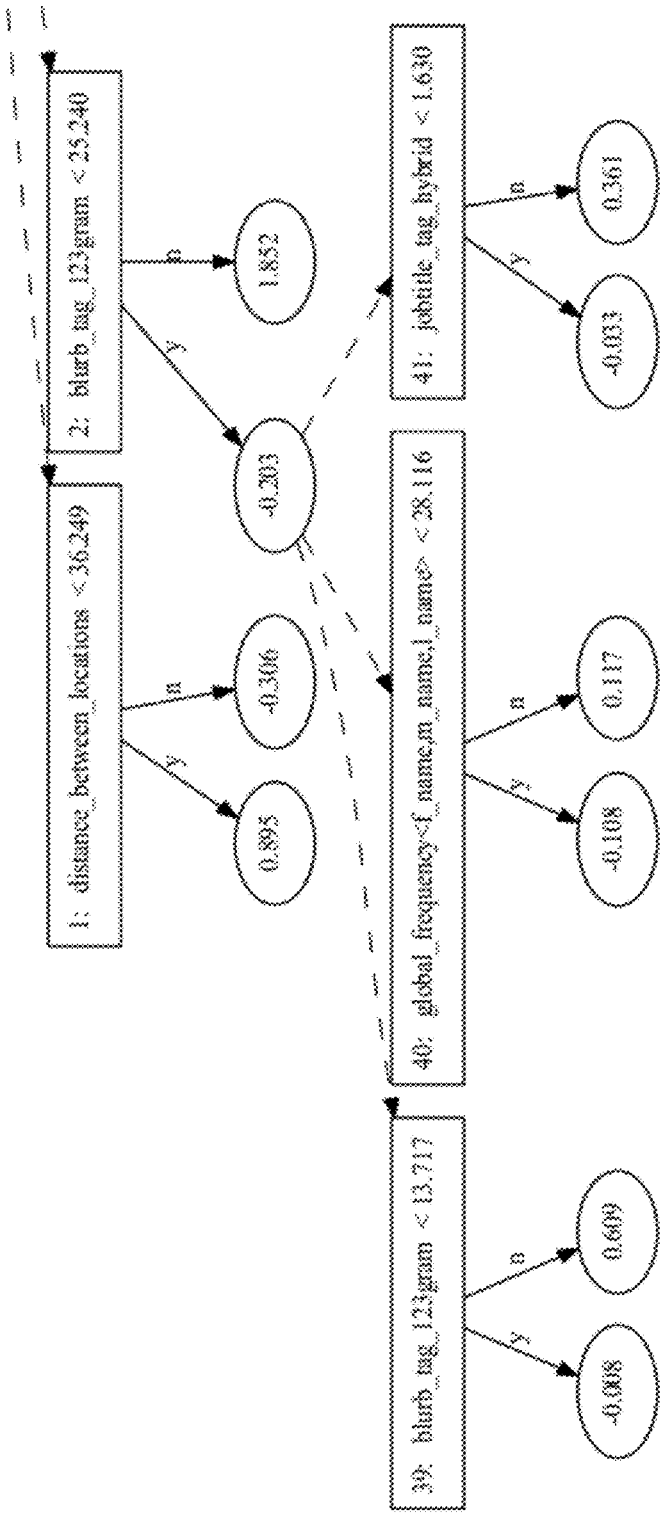
FIG. 17A-17W are together an extended drawing showing an example CS-ADTree (if name_suffix=differ, we get a strong negative score and don't query additional features) (to assemble this drawing, place FIG. 17A on the left, FIG. 17B to the right of FIG. 17A, FIG. 17C to the right of FIG. 17B, and so on)
Figure 17B:
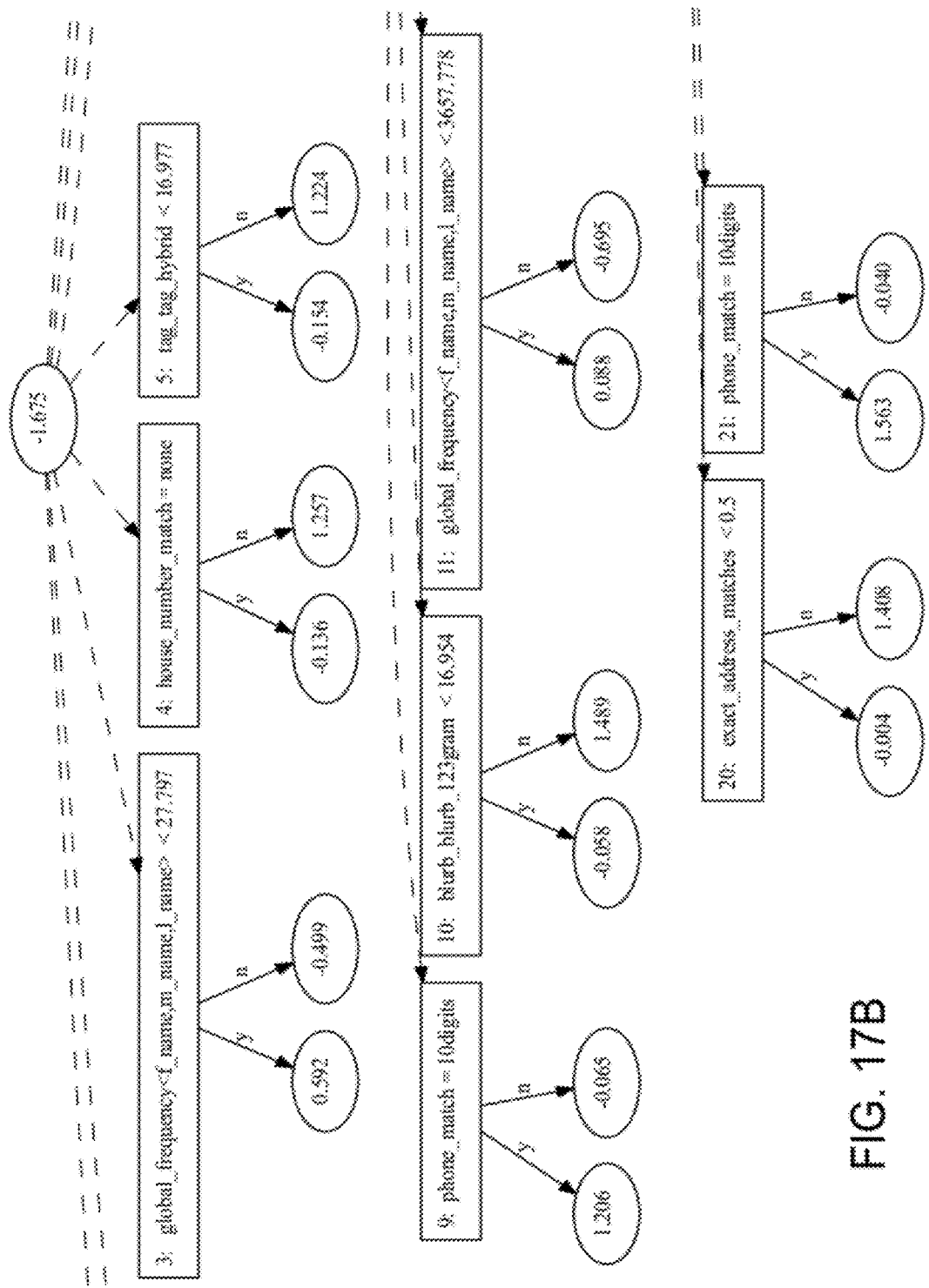
FIG. 17X shows a subset of certain relevant nodes from the CS-ADTree shown collectively in the extended drawing of FIG. 17A-17W which illustrates the effect of the name_suffix feature.
Figure 17C:
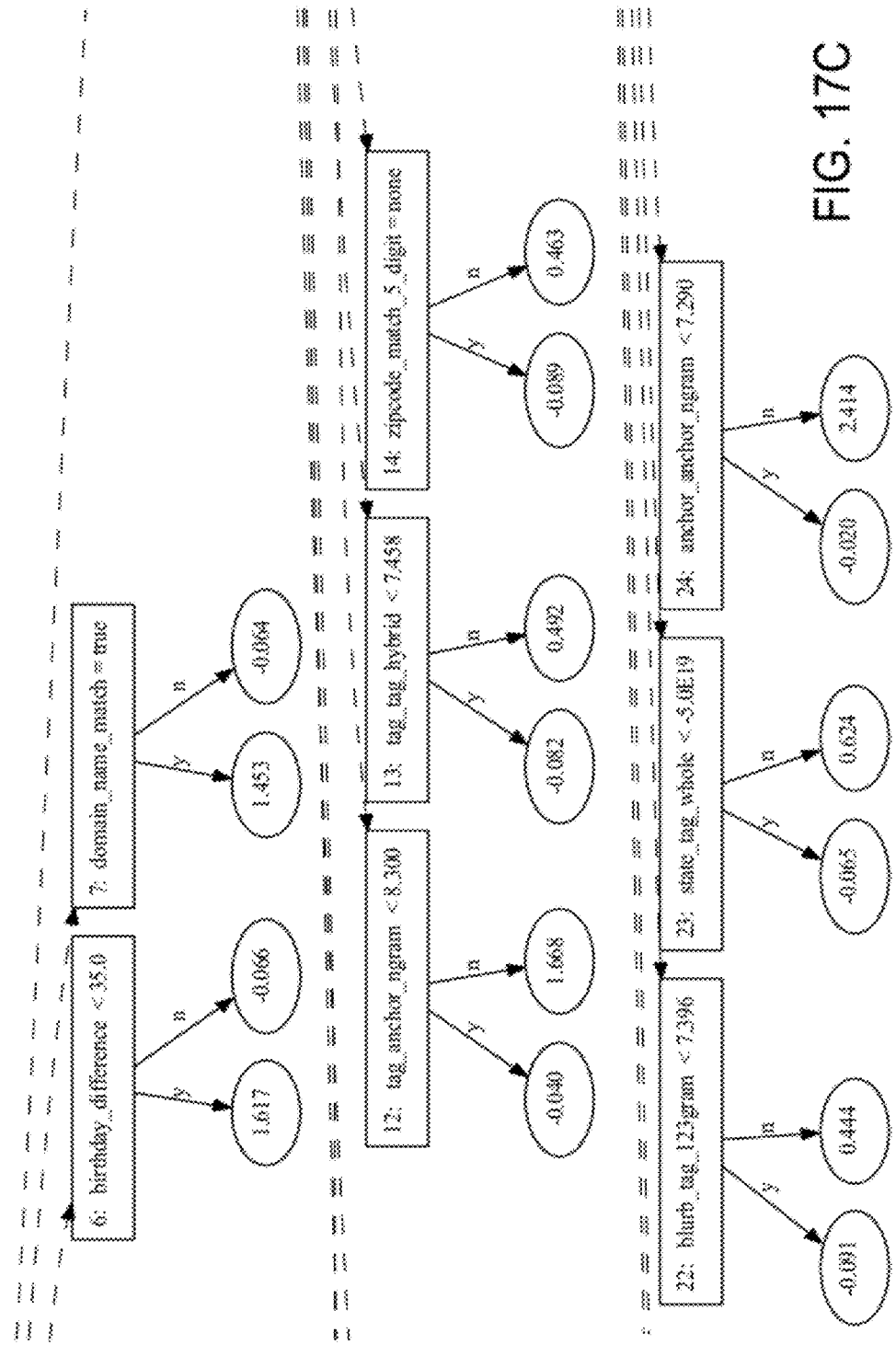
Figure 17D:
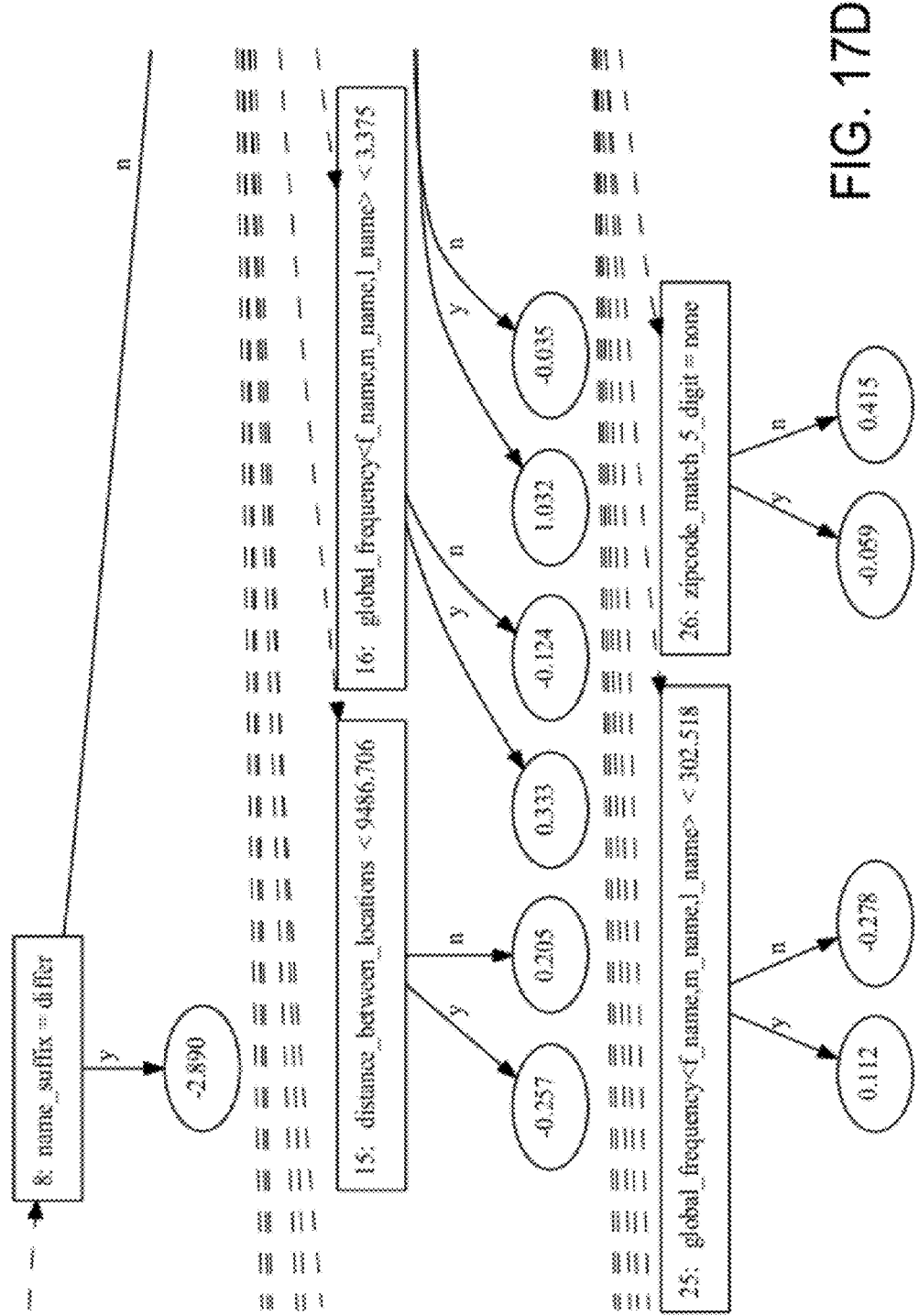
Figure 17F:
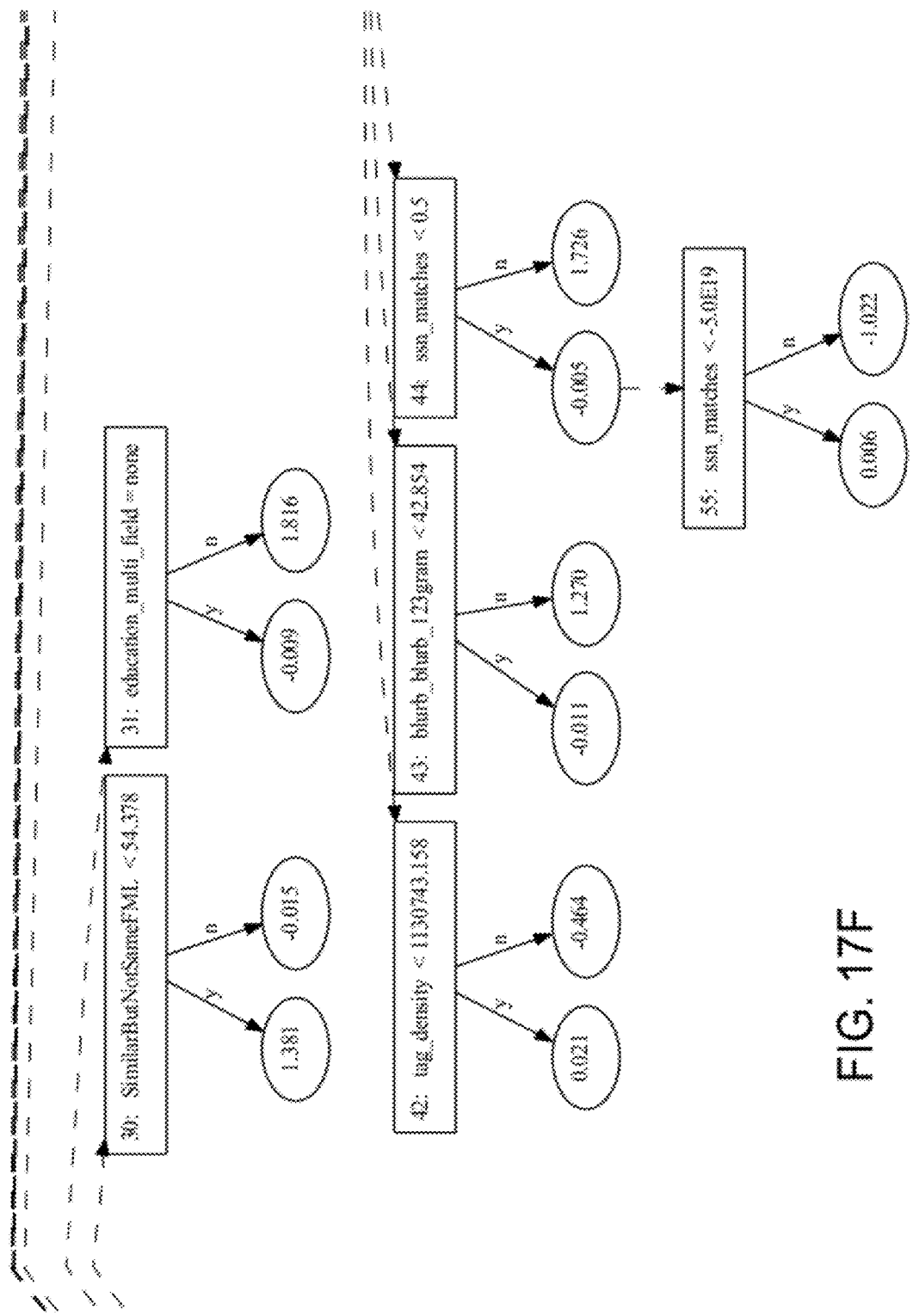
Figure 17G:
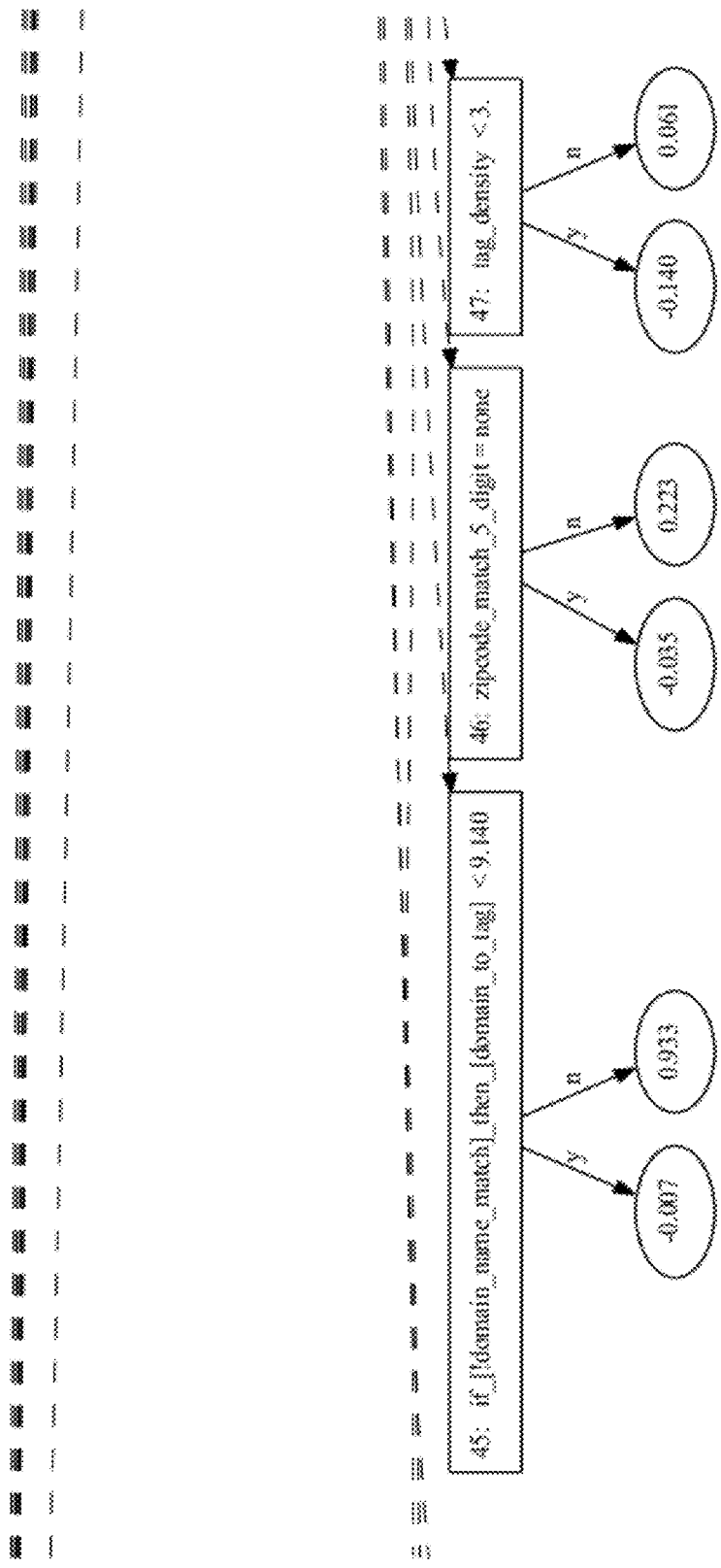
Figure 17H:
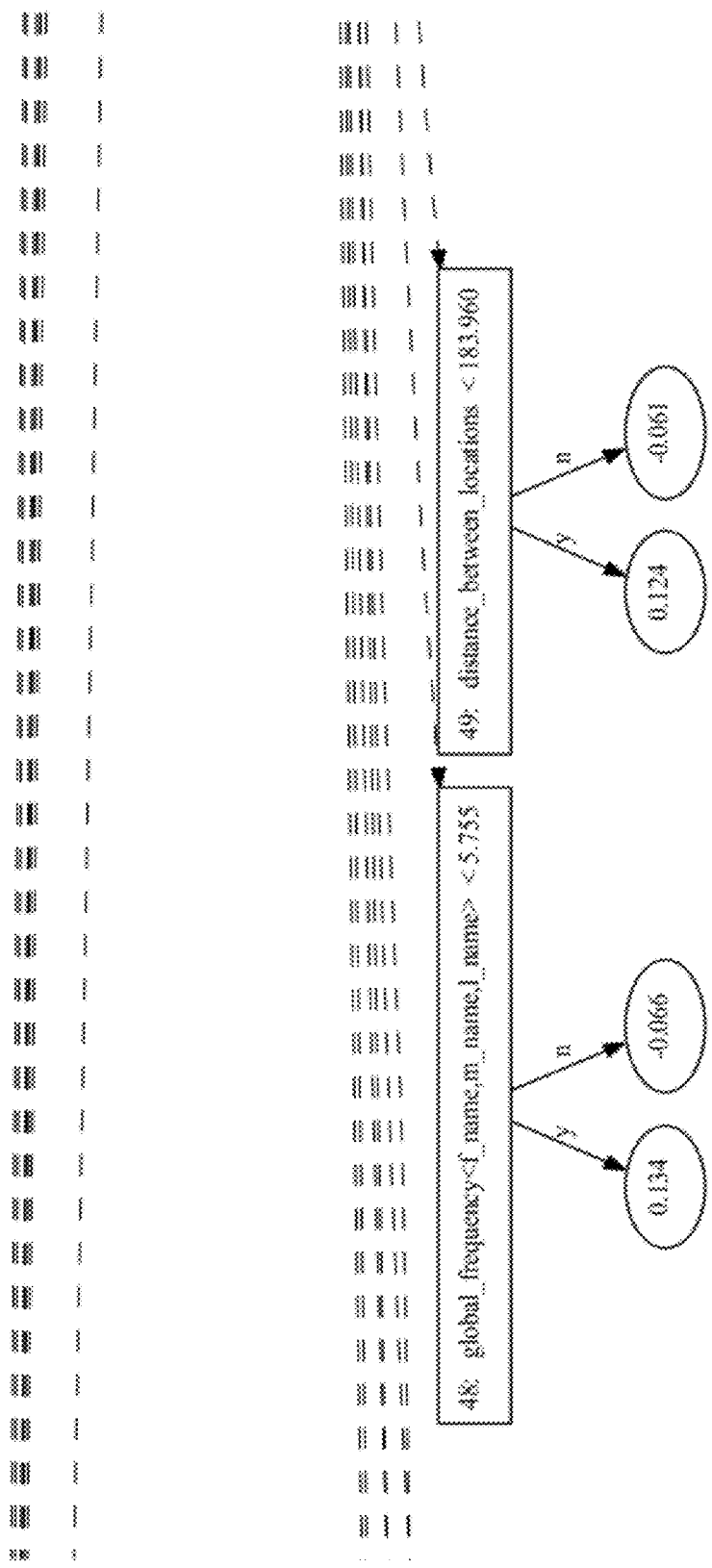
Figure 17I:
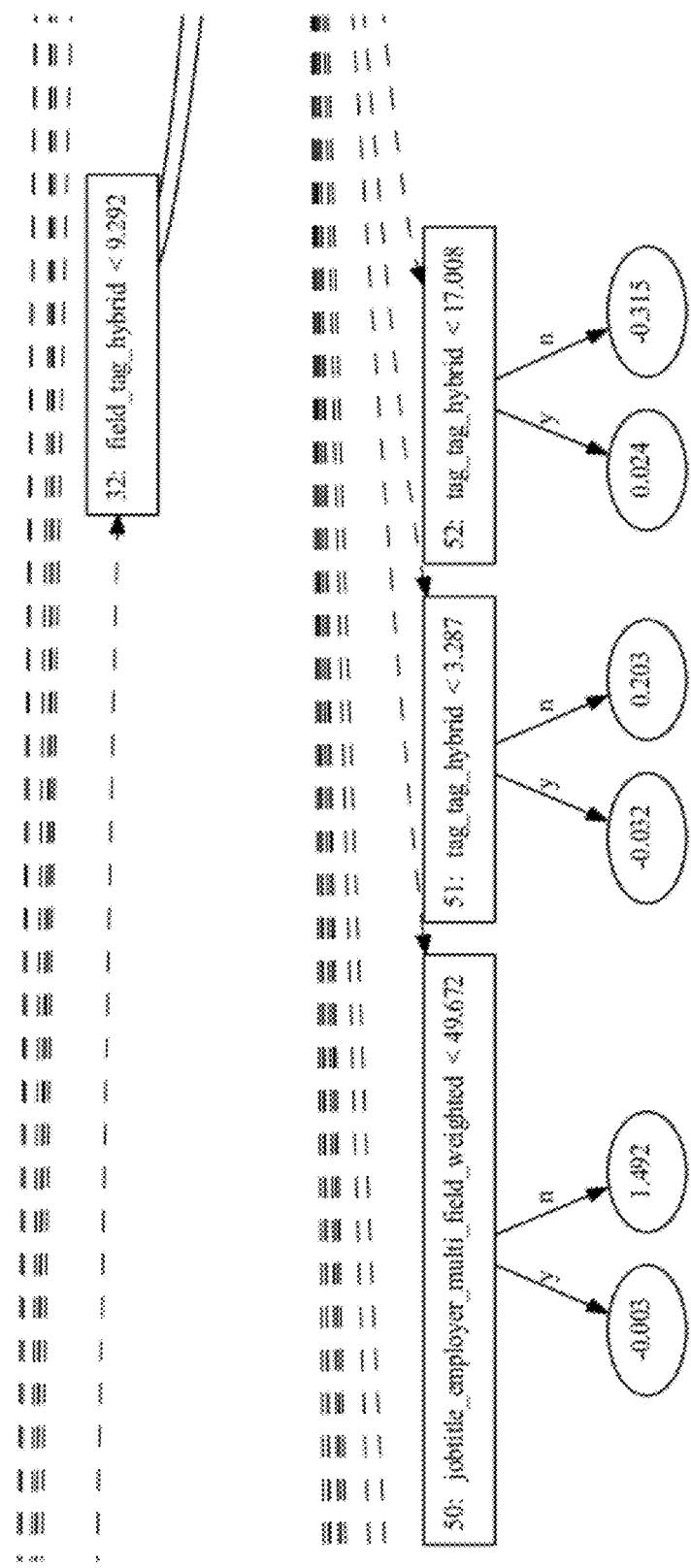
Figure 17J:
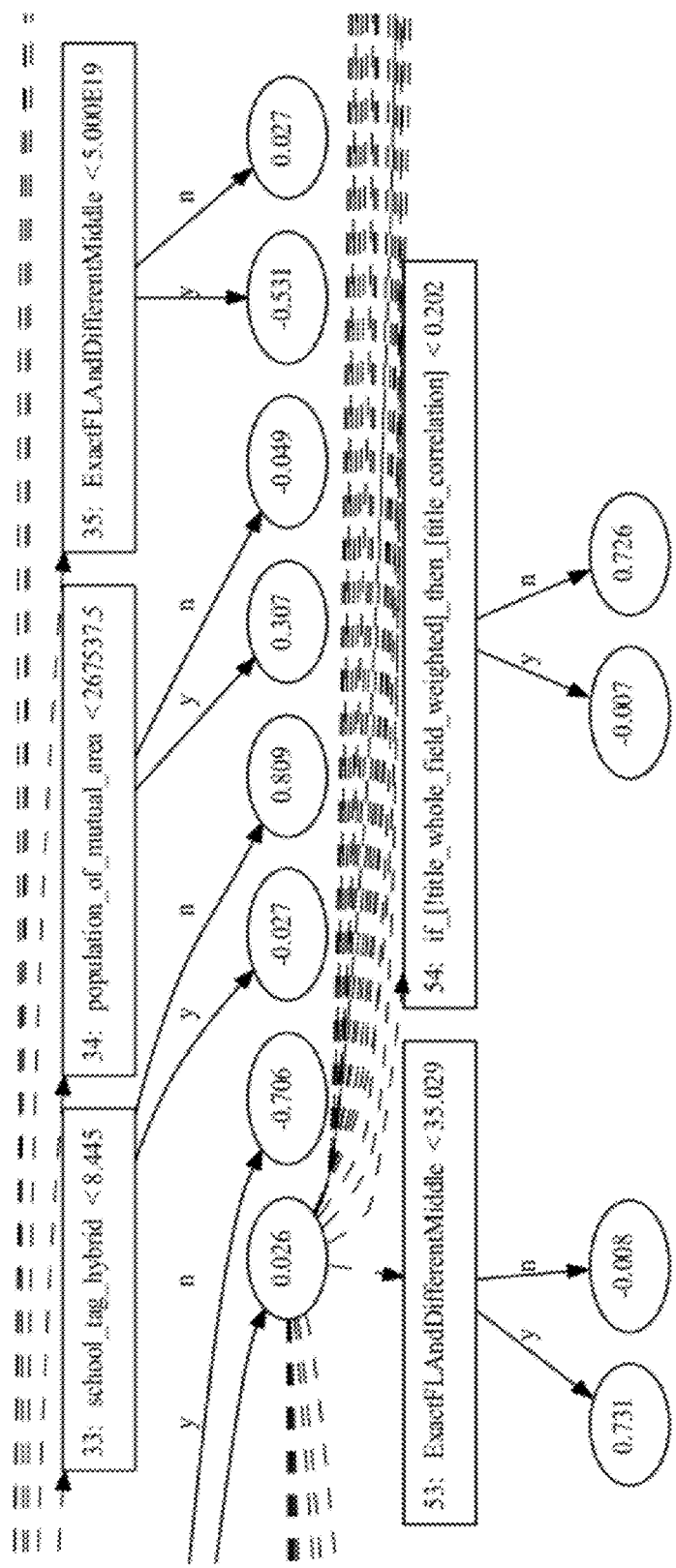
Figure 17K:
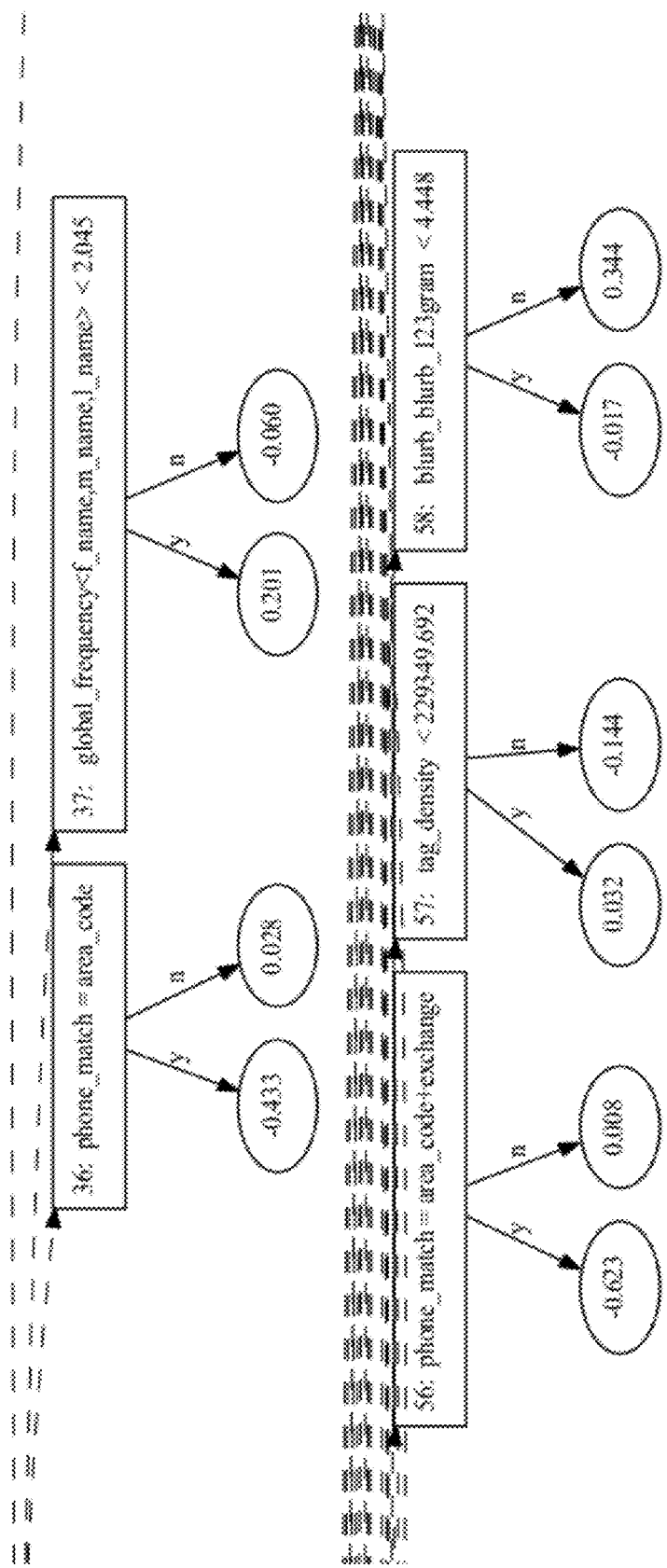
Figure 17L:
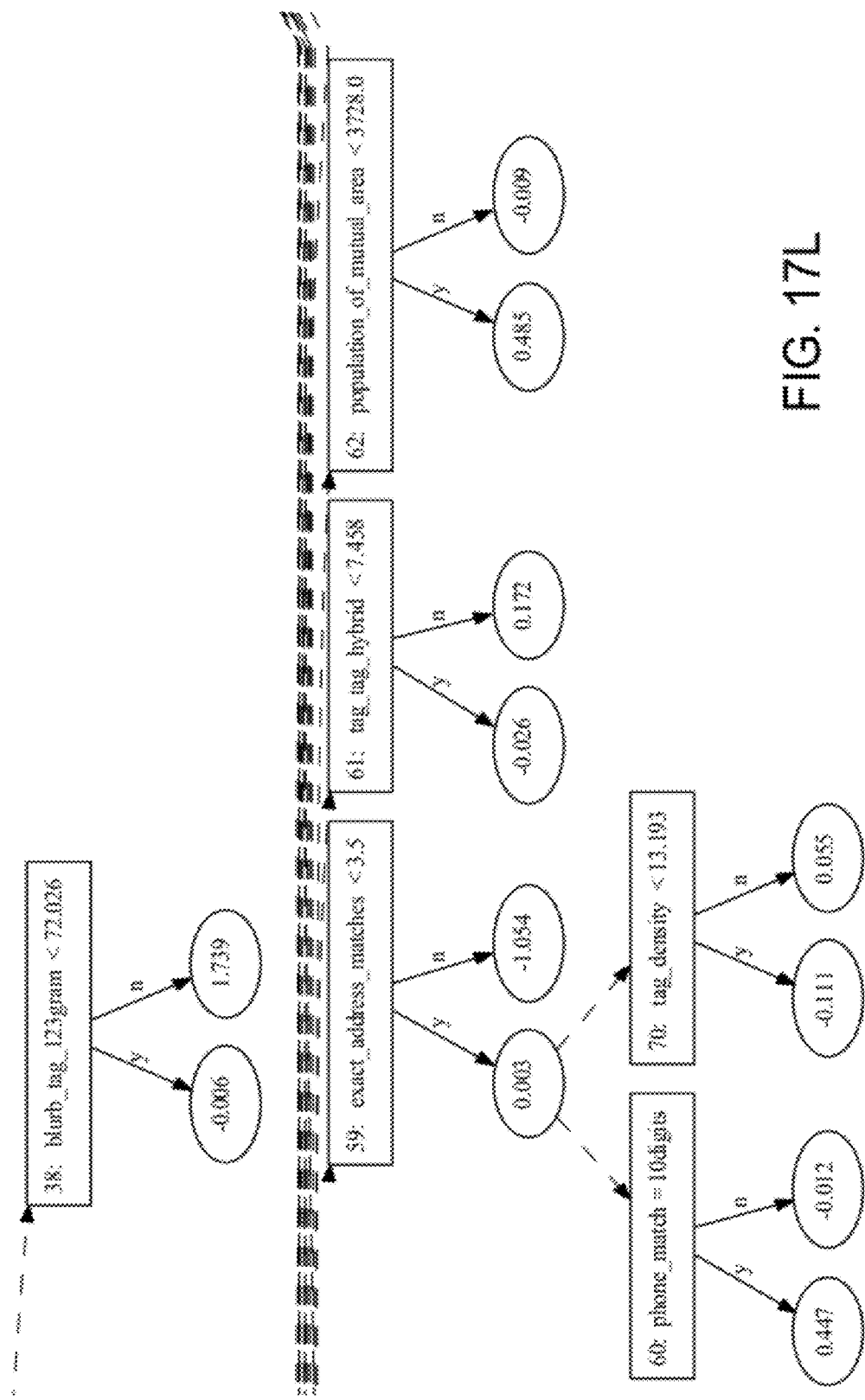
Figure 17M:
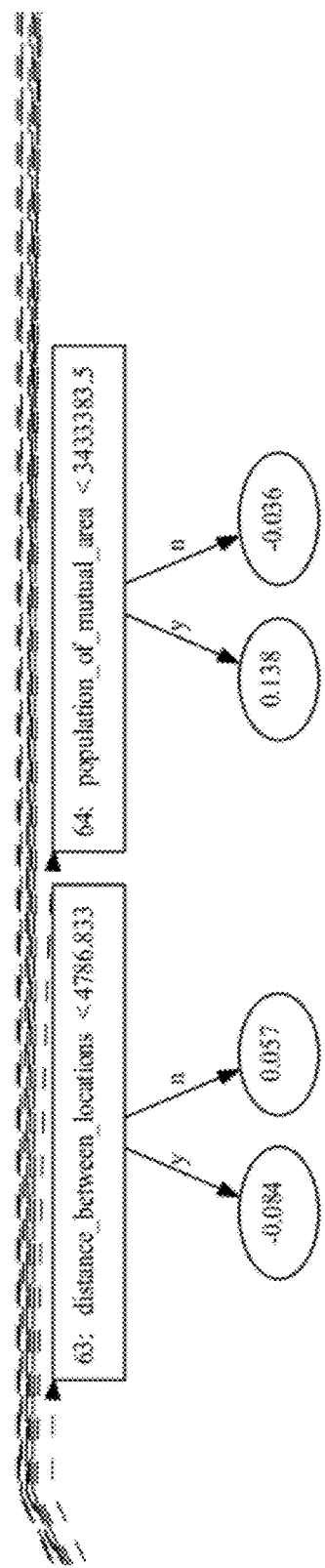
Figure 17N:
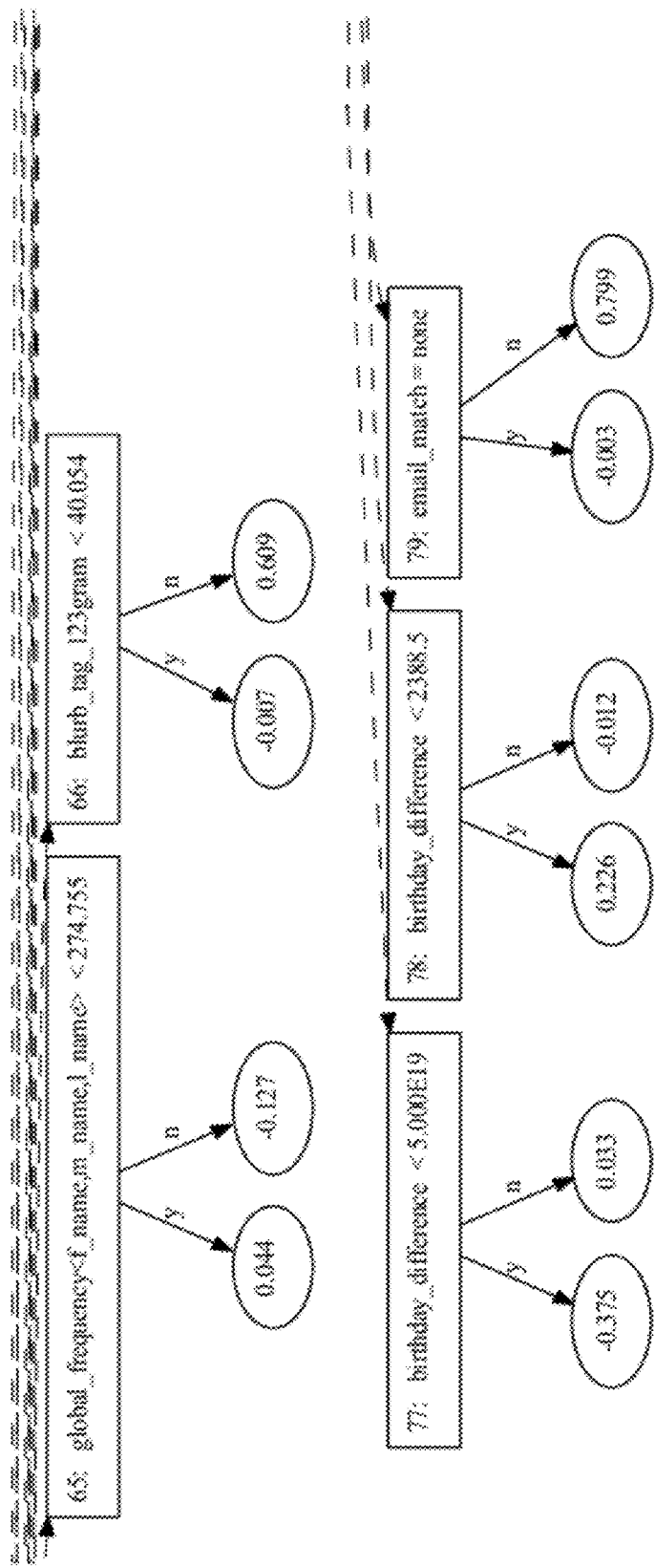
Figure 17O:
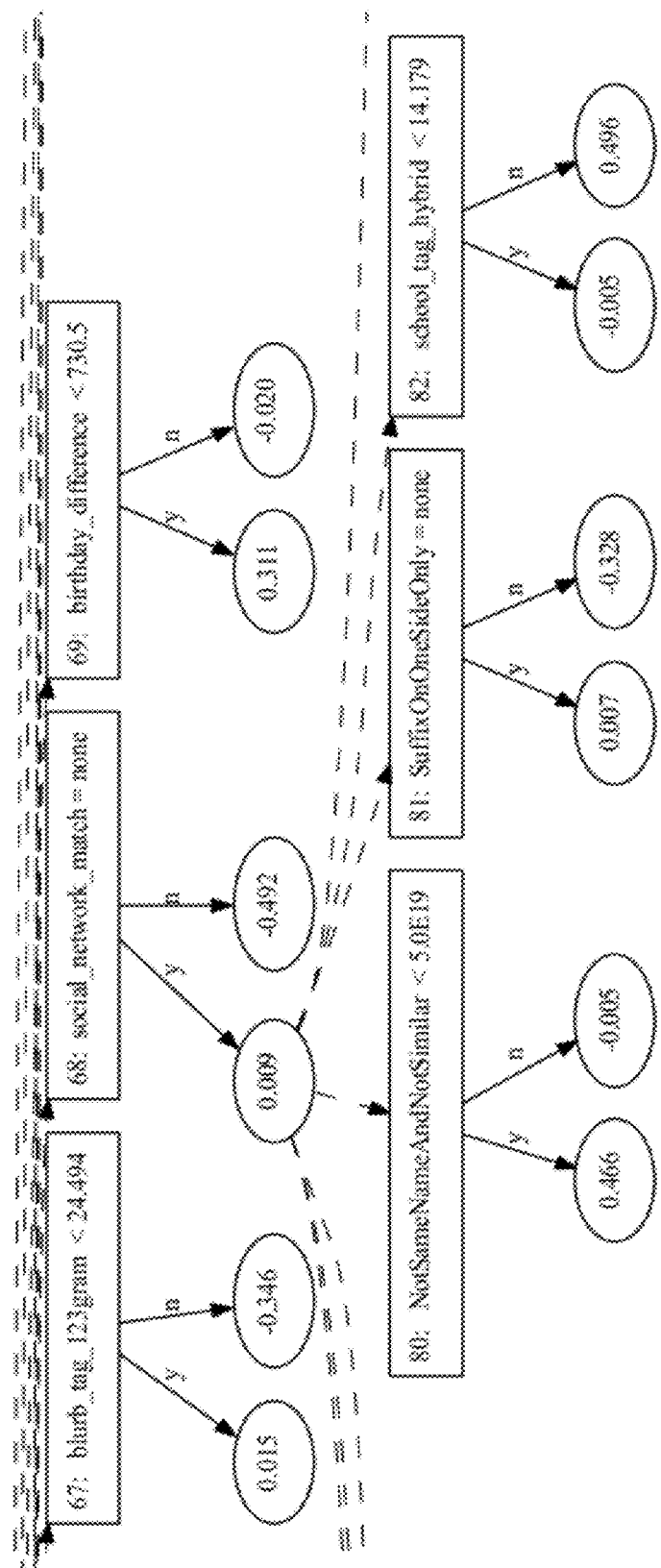
Figure 17P:
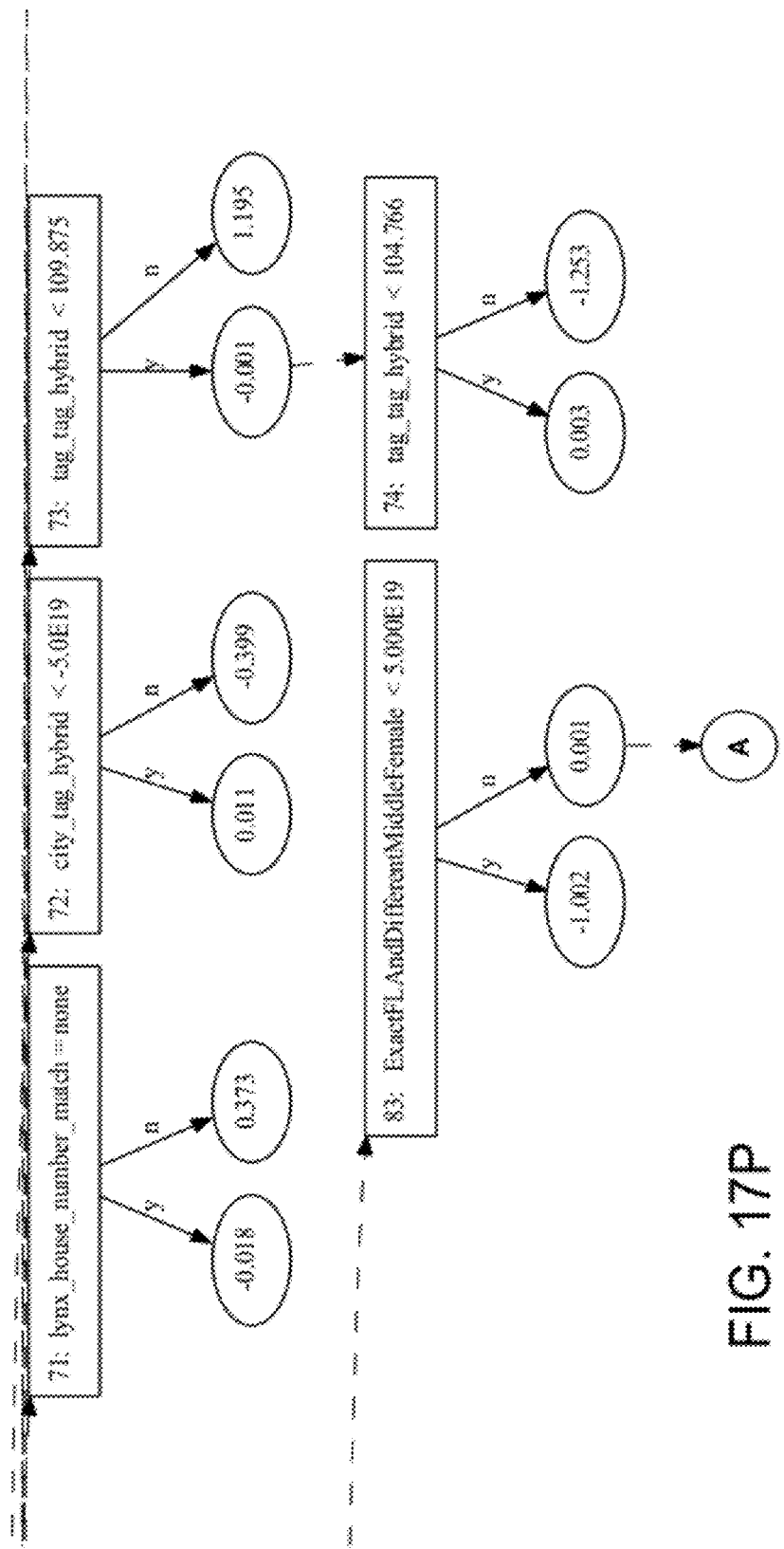
Figure 17Q:
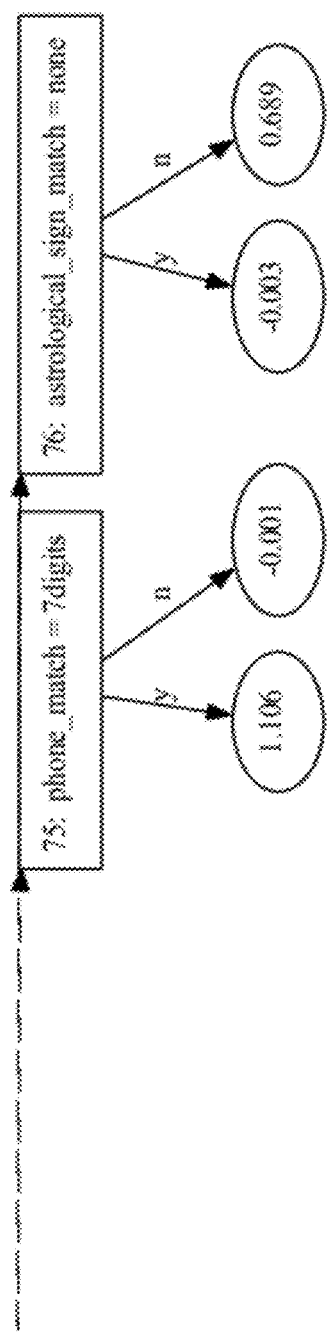
Figure 17R:
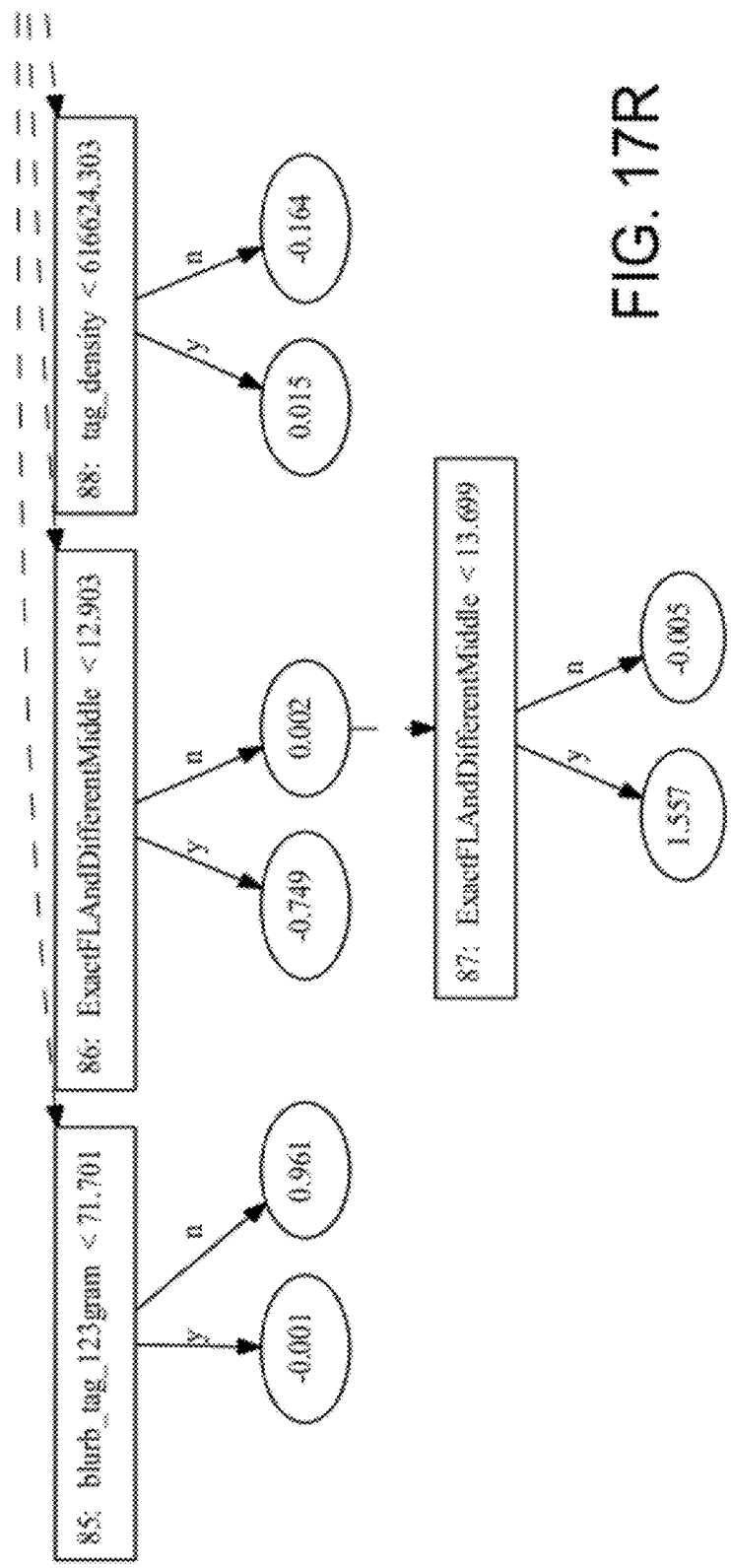
Figure 17S:
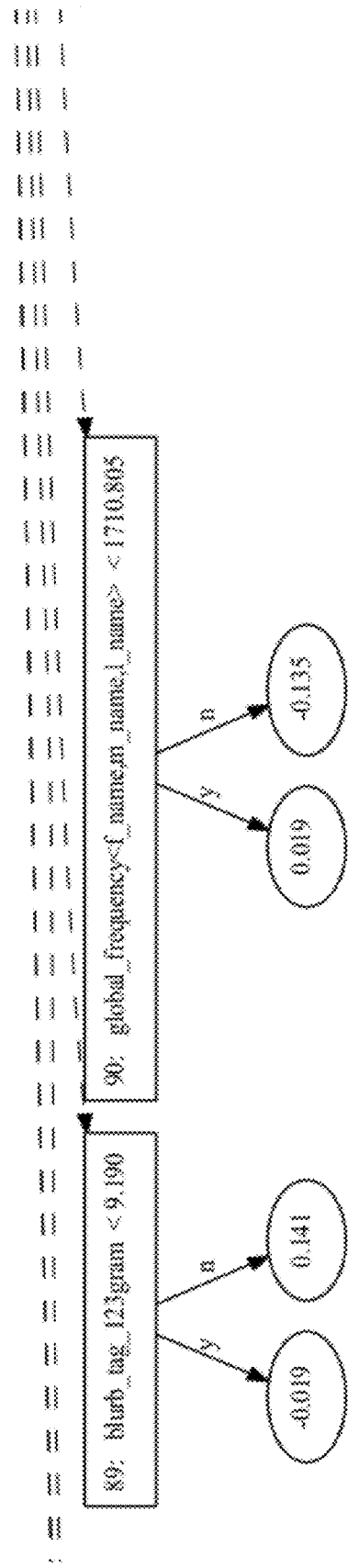
Figure 17T:
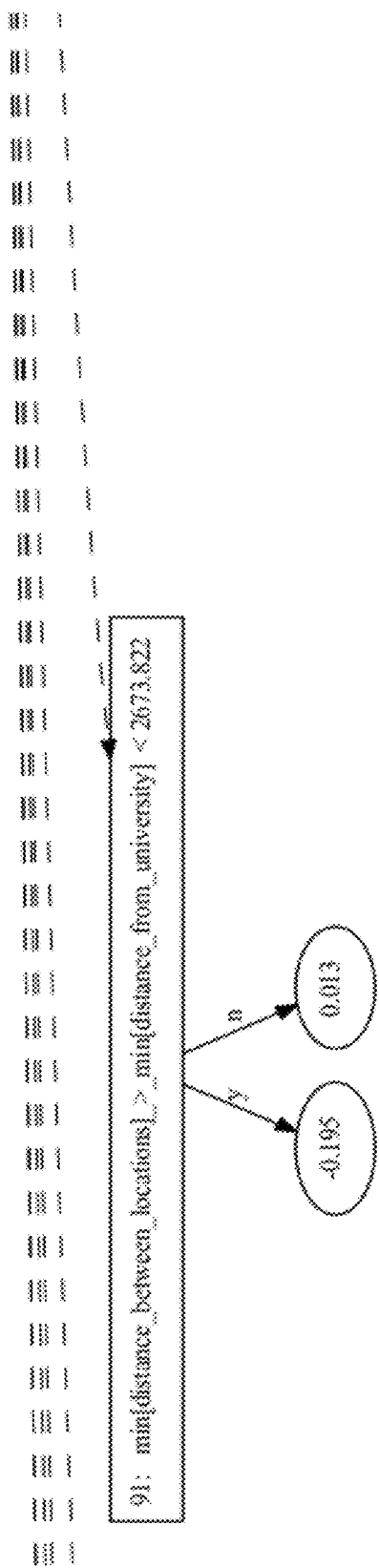
Figure 17U:
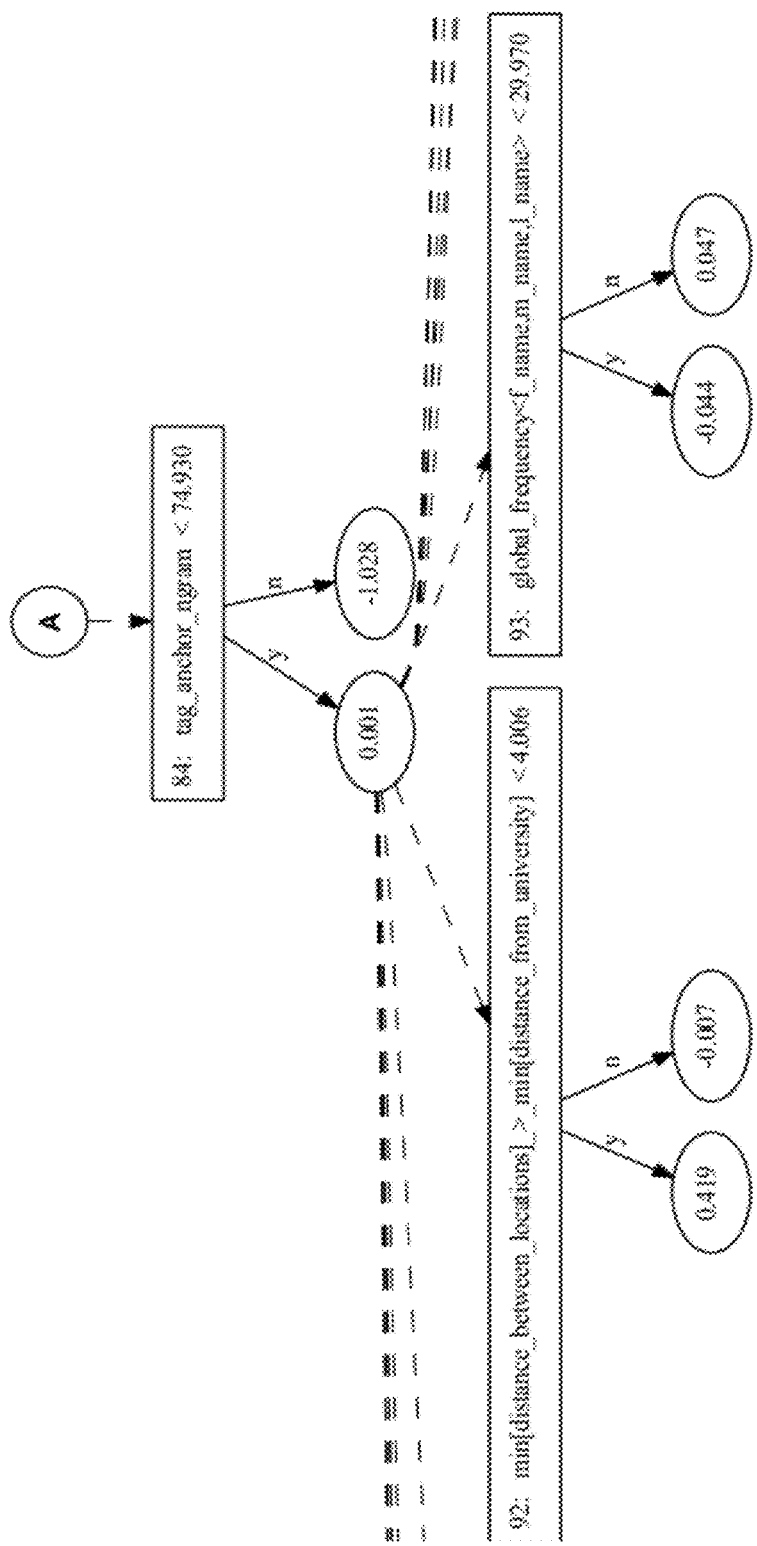
Figure 17V:
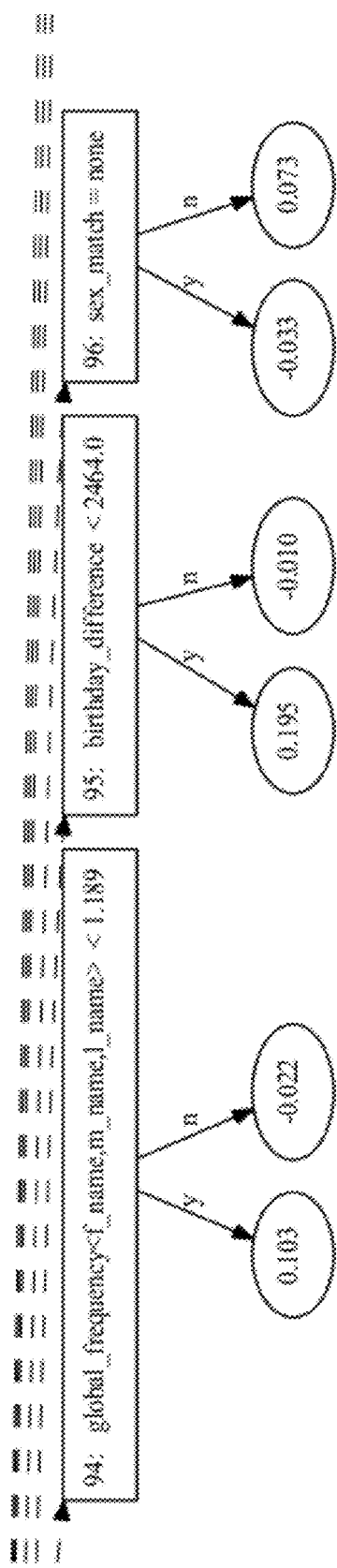
Figure 17W:
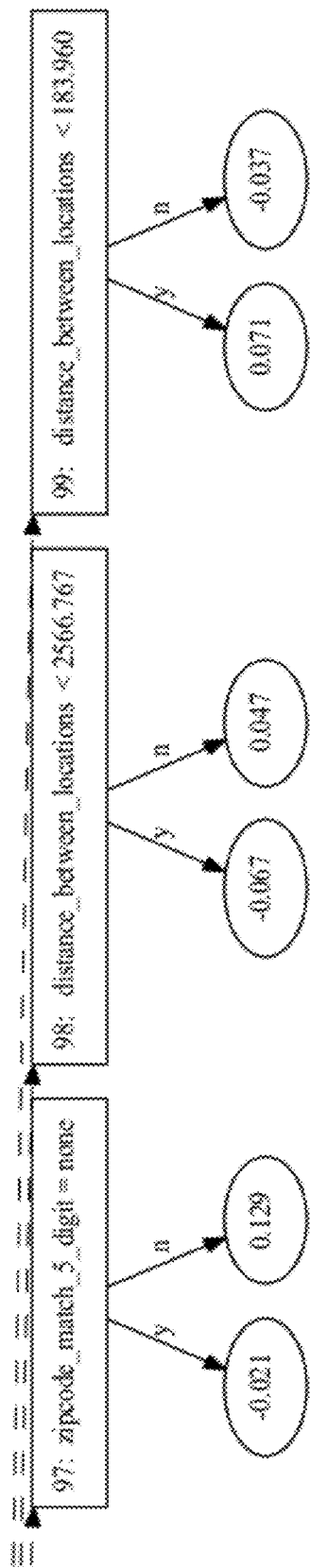
Figure 17X:
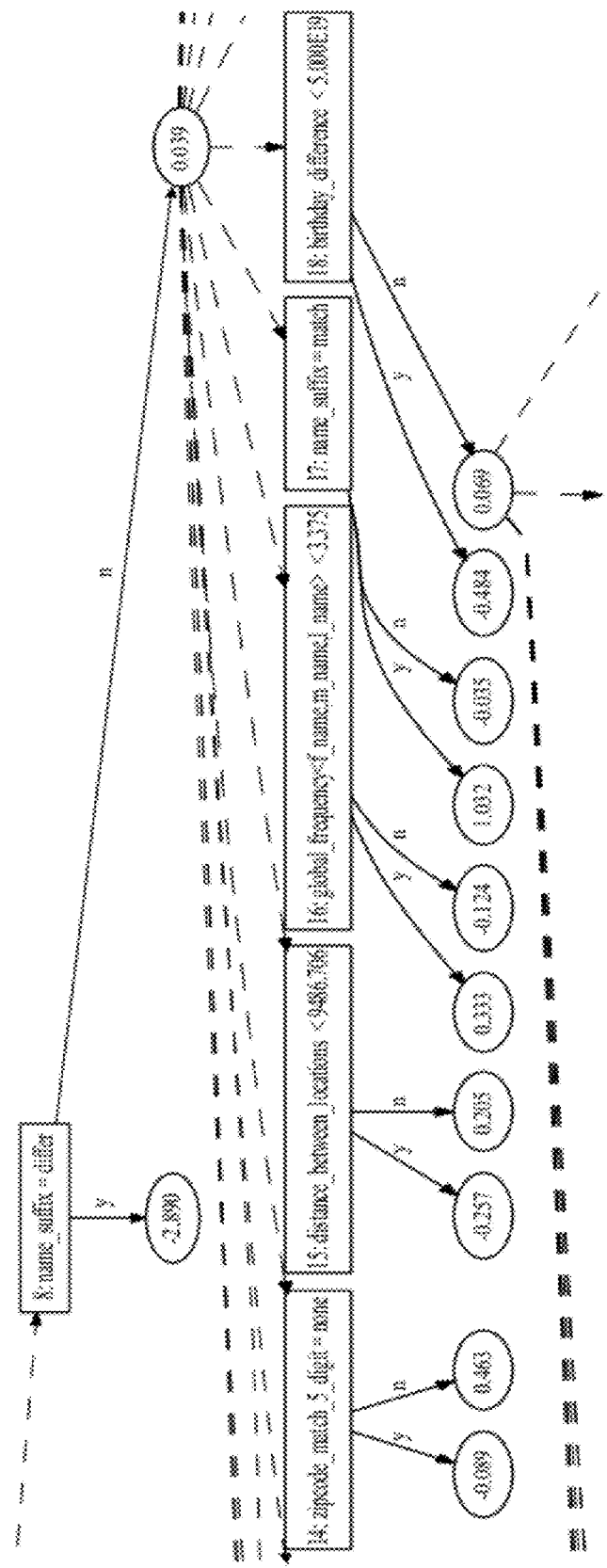
Figure 18:
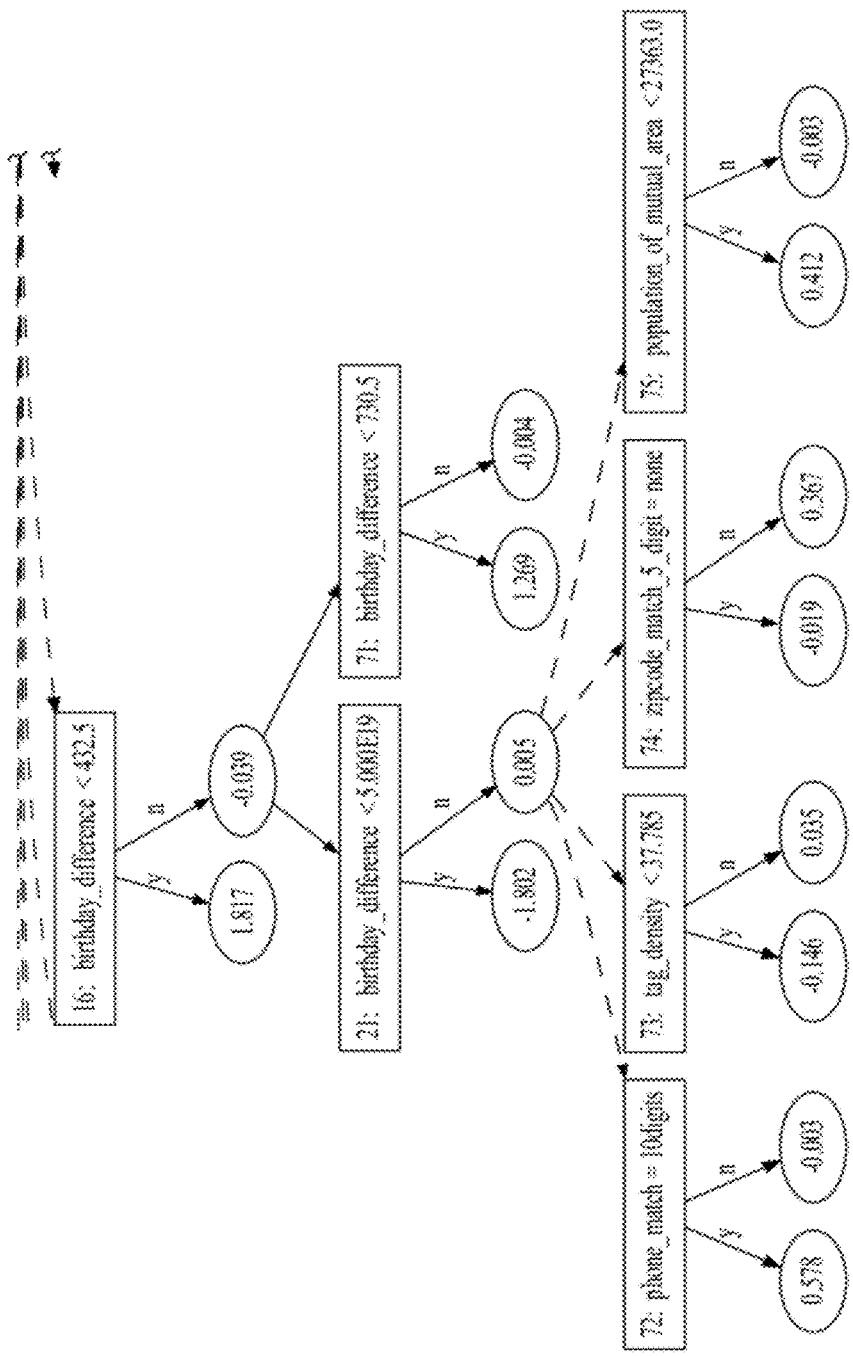
FIG. 18 is an example partial CS-ADTree. Note how we assign different scores to different birthday distances and query additional features if birthday difference is unknown (infinite)

To demonstrate how run-time representation of CS-ADTree can help a practitioner better understand the record linkage problem of his/her database in a human-interpretable way, we present a snapshot of a CS-ADTree generated by our initial labeled database S in FIG. 17A-W, and also partial snapshot of that tree in FIG. 17X. In FIG. 17A-W (and see also the specific nodes shown in FIG. 17X), one can clearly see that the decision node of name_suffix resides right below the root node. When name_suffix=differ, the corresponding path ends immediately and assigns a large negative score to the instance under consideration, otherwise CS-ADTree would go on to check many other features. This is exactly as predicted by our discussion for the name_suffix feature above. Note also that this tree can be very efficiently computed if the features are lazily evaluated. If the name suffix differs, there is no need to compute the values for features 14-18, which all have name_suffix≠"differ" as a precondition (in fact, 87 out of the 100 features in this sample CS-ADTree have this as a precondition). More hierarchical levels are involved in the example in FIG. 18. If the value of feature birthday_difference for a pair of records is relatively small, (the birthdays are less than 432.5 days apart), CS-ADTree would terminate the corresponding path by just examining the value of birthday_difference. This is intuitive because having nearly matching birthdays is a strong "match" indicator. We don't need to ask further questions to reach a decision. Otherwise it asks if birthday_difference is greater than $5 \times 10^{19}$, i.e., infinity, which is how we indicate a null value (birthday isn't present on one or the other records). In this case, CS-ADTree would continue to check a number of other features to determine the match/unmatch status of the pair of records. So in both cases, the derived model is easy to understand and can be seen to be doing something reasonable.

Efficiency

Our non-limiting experiments also show that ADTree and CS-ADTree are efficient at training and run-time. Given 50 candidate features, a training set of 11,309 example pairs, and a pre-computed feature vector, we trained the system on JBoost using CS-ADTree for 200 iterations in 314 seconds. On a major run of the system using a Python implementation and a 100 node model, the model performed 180 record pair comparisons per second per processor, including both the time to compute feature computations and the computation in the CS-ADTree. All statistics were on an Intel Xeon 2.53 GHz processor with 60 GB of RAM.

Performance of ADTree/CS-ADTree with Active Learning

The initial database S can be amplified by picking records from a data pool with size $8 \times 10^6$ which are then presented to Turkers for labeling. Denoting the pairwise classifier trained on S to be $\mathcal{H}$ the principle of choosing records are based on three active learning approaches listed as follows, The first example non-limiting approach serves as our baseline active learning model, which is basically to randomly choose r∈S, s.t., $\mathcal{H}$ (r)>−3. The reason we choose −3 as the threshold to pick records is based on the empirical observation that examples in S that are given a prediction score by $\mathcal{H}$ greater than −3 exhibit an appropriate proportion between positive and negative examples, i.e., negative examples shouldn't be excessively outnumbered by positive examples to avoid Turkers from clicking "match" all the way through.

The second illustrative non-limiting approach is based on the randomized parameter approach. Instead of always splitting with the feature of minimum loss Z, we enable CS-ADTree to always randomly choose 1 of the 3 features with minimum losses across all features. A committee of 5 CS-ADTree's trained on S is then created as $\{\mathcal{H}_0, \mathcal{H}_1, \mathcal{H}_2, \mathcal{H}_3, \mathcal{H}_4\}$, records r∈S with minimal absolute committee score, i.e., $$\left| \sum_{i=0}^{4} (\mathcal{H}_i(r)) \right|,$$

will be picked for class labeling.

An additional example non-limiting approach is pretty straightforward. We choose records r∈S with minimal absolute prediction score by $\mathcal{H}$ i.e., |$\mathcal{H}$ (r)|, since it represents a small margin given the natural threshold 0 which signifies the uncertainty of $\mathcal{H}$ for classifying the particular instance. This approaches resonates with our argument that a model that yields our desired precision, π at a threshold close to 0 will have close to optimal recall.

Figure 19:
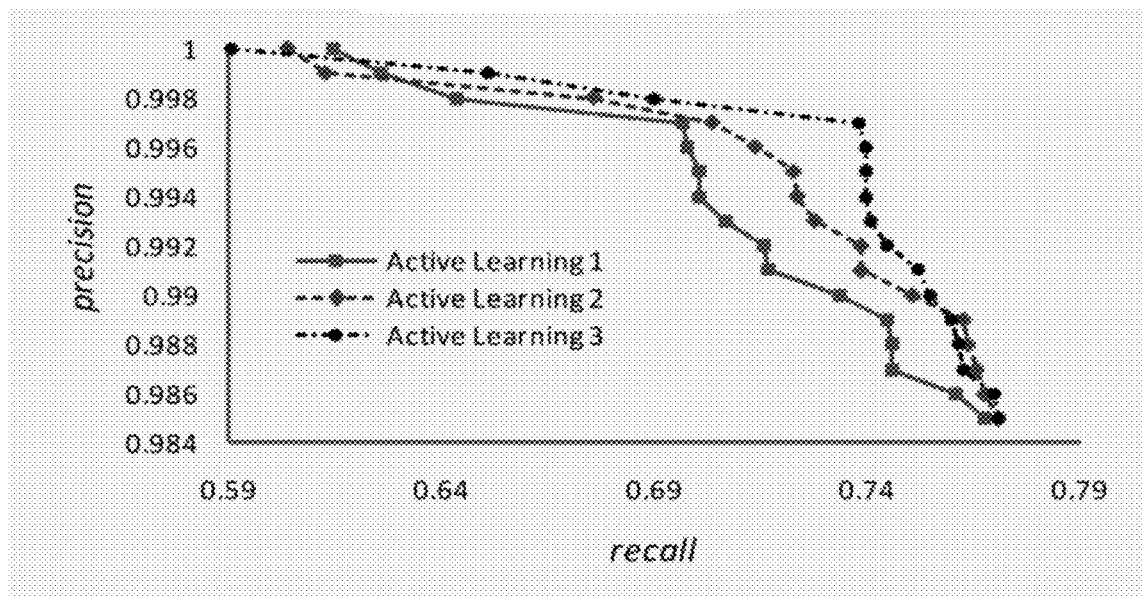
FIG. 19 is an example non-limiting illustrative set of P-R curves of 3 active learning approaches.

We pick 1000 pairs of records from the data pool using each of the three active learning approaches, which yields 3000 records in total. We also pick another 5000 pairs of records using active learning approach 1 to serve as the independent data set $\mathcal{E}$ for evaluating the learning models. The P-R curves of CS-ADTree trained on S plus the records picked by each of three active learning approaches are given in FIG. 19, which clearly shows active learning approaches 2 and 3 perform better than the baseline approach.

Figure 20:
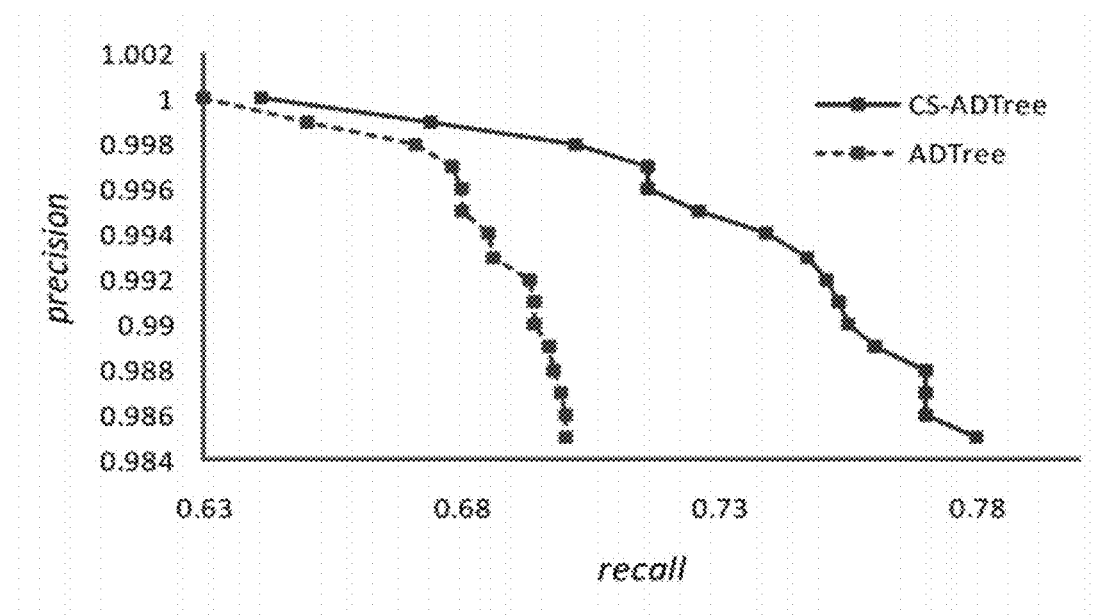
FIG. 20 shows example non-limiting illustrative P-R curves of ADTree and CS-ADTree on an example illustrative evaluation dataset $\mathcal{E}$.

Expanded by the 3000 pairs of records picked by active learning approaches, S now becomes noisier since it is unavoidable that class labels assigned by Turkers will be partially erroneous. Using ADTree and CS-ADTree to derive classifiers from S, FIG. 20 shows the P-R curves of applying these classifiers on independent data set $\mathcal{E}$, which clearly indicates CS-ADTree exhibits improved performance compared to ADTree for record linkage of a noisy database.

Figure 21:
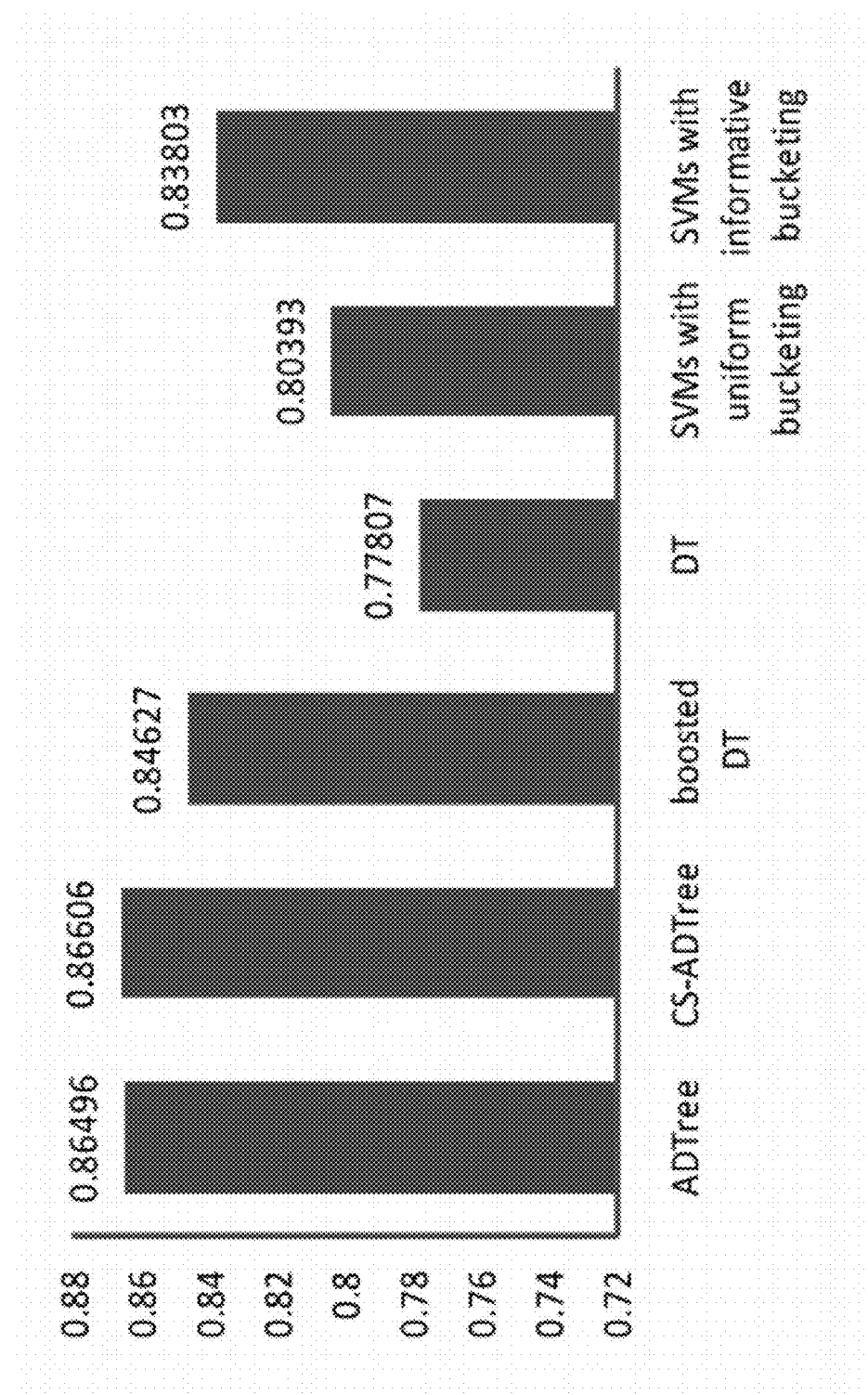
FIG. 21 is an exemplary non-limiting illustrative histogram of f-measure's for ADTree, CS-ADTree, and alternative ML techniques on $\mathcal{E}$.

In order to demonstrate the competitiveness of ADTree/CS-ADTree against other popular ML techniques used by record linkage designers, we also apply decision tree (DT), boosted DT (T=200), and SVMs to classify pairs of records in $\mathcal{E}$. The kernel function selected for SVMs is the Gaussian kernel with σ=0.1. Empirical study discovers that SVMs cannot efficiently handle the original feature representation, i.e., a mixture of categorical and numerical features. Thus we apply two strategies to transform the features to cater for SVMs' needs. Categorical features are all transferred into discrete integers for both strategies. For numerical features, strategy 1 is uniform bucketing which evenly divides its data range into 5 buckets, and transforms the feature value into the integral index of the bucket it falls in. Strategy 2 is informative bucketing which efficiently makes use of the information provided by the CS-ADTree structure after training. If numerical feature f is split on values of $p_0 < p_1 < \ldots < p_n$ in the training process of CS-ADTree, any feature value v of f will be rewritten into integer i, s.t., $p_i \leq v \leq p_{i+1}$. Using 0 as the threshold for ADTree/CS-ADTree, FIG. 21 shows the f-measure of ADTree, CS-ADTree, boosted decision tree, decision tree, and SVM's using two bucketing strategies. It is obvious that ADTree and CS-ADTree both perform better than alternative ML techniques on record linkage of $\mathcal{E}$. They can also be used in combination with such other techniques.

Applicant incorporates herein by reference as if expressly set forth herein Chen et al, "The Case for Cost-Sensitive and Easy-To-Interpret Models in Industrial Record Linkage," 9th International Workshop on Quality in Databases (Seattle Wash. Aug. 29, 2011).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A record linkage method comprising:
 (a) acquiring data with a computer processing arrangement executing program instructions and connected to an electronic network;
 (b) blocking, with the computer processing arrangement, the acquired data to find and block similar data into a blocked database;
 (c) applying, with the computer processing arrangement, a feature set with a machine learning model based at least in part on cost-sensitive alternating decision trees to selectively link the blocked acquired data in the blocked database;
 (d) storing the selectively-linked data in computer memory; and
 (e) enabling users to access and search said selectively-linked data via said electronic network,
 wherein the computer processing arrangement trains the cost-sensitive alternating decision trees from a plurality of training examples in a training database; assigns, prior to the training, the plurality of training examples with a plurality of non-uniformly distributed cost factors for the training to quantify the cost of misclassifying, and updates a weight distribution in a biased manner towards training examples with higher costs.

2. A non-transitory storage medium arrangement storing computer program instructions that operate on plural records, said storage medium arrangement storing the following computer program instructions:
 (a) blocking instructions that control the computer to block the plural records and store the blocked plural records in a blocked database;
 (b) training instructions that control the computer to train a machine learning model based at least in part on cost-sensitive alternating decision trees using a plurality of training examples in a training database; prior to the training, assign the plurality of training examples with a plurality of non-uniformly distributed cost factors for the training to quantify the cost of misclassifying; and update a weight distribution in a biased manner towards training examples with higher costs; and
 (c) applying instructions that apply a feature set with the generated machine learned model to selectively link the blocked plural records in the blocked database.

3. The non-transitory storage medium arrangement of claim 2 wherein the storage medium arrangement further stores execution instructions that use said learned model to determine whether to link records.

4. The non-transitory storage medium arrangement of claim 3 wherein the execution instructions use said learned model to link records by classifying a pair of records in a database into match or unmatch.

5. The non-transitory storage medium arrangement of claim 2 wherein the training instructions provide for recall at precisions in excess of 99%.

6. The non-transitory storage medium arrangement of claim 2 wherein the training instructions generate a learned model that is understandable by humans.

7. The non-transitory storage medium arrangement of claim 2 wherein the training instructions assign a cost factor $c_i \in (0, \infty)$ to each training example $x_i, y_i$ in the training database to quantify the cost of misclassifying x, into a class label other than $y_i$.

8. The non-transitory storage medium arrangement of claim 2 wherein the training instructions provide boosting to derive a classifier from the plurality of training examples in the training database.

9. A method of operating on plural records comprising:
 (a) with a computing arrangement, blocking the plural records to provide a blocked database;
 (b) training, with the computing arrangement, a plurality of training examples in a training database to generate a machine learned model using a cost-sensitive alternating decision tree, the computing arrangement prior to the training assigning the plurality of training examples with a plurality of non-uniformly distributed costs for the training to quantify the cost of misclassifying, and updating a weight distribution in a biased manner towards training examples with higher costs; and (c) applying, with the computing arrangement, a feature set with the generated machine learned model to selectively link the blocked plural records in the blocked database.

10. The method of claim 9 further including using said learned model to determine whether to link records in the blocked database.

11. The method of claim 10 further including using said learned model to link records by classifying a pair of records in a database into match or unmatch.

12. The method of claim 9 further including providing for recall at precisions in excess of 99%.

13. The method of claim 9 further including generating a learned model that is understandable by humans.

14. The method of claim 9 further including boosting to derive a classifier from the training database.

15. A system for operating on plural records comprising:
a computer-based blocker that finds similar records and blocks the similar records to provide a blocked database;
a computer-based machine learner that uses at least one processor to train on a plurality of training examples in a training database to generate a machine learned model using an alternating decision tree, the computer-based machine learner prior to the training assigning the plurality of training examples with a plurality of non-uniformly distributed costs for the training to quantify the cost of misclassifying, and updating a weight distribution in a biased manner towards training examples with higher costs;
a computer-based linker that applies a feature set with the generated machine learned model to selectively link the blocked similar records in the blocked database; and
a computer-based execution component connected to the Internet that provides a background check or an identity check on demand at least in part in response to records linked based on said machine-learned model in response to a user search requested over the Internet.

\* \* \* \* \*